United States Patent
Hollinger et al.

(10) Patent No.: US 11,868,444 B2
(45) Date of Patent: Jan. 9, 2024

(54) CREATING SYNTHETIC VISUAL INSPECTION DATA SETS USING AUGMENTED REALITY

(71) Applicant: International Business Machines Corporation, Armonk, NY (US)

(72) Inventors: Michael Charles Hollinger, Austin, TX (US); Mal Pattiarachi, Boston, MA (US); Abhinav Pratap Singh, Milton (CA)

(73) Assignee: International Business Machines Corporation, Armonk, NY (US)

( * ) Notice: Subject to any disclaimer, the term of this patent is extended or adjusted under 35 U.S.C. 154(b) by 290 days.

(21) Appl. No.: 17/380,075

(22) Filed: Jul. 20, 2021

(65) Prior Publication Data
US 2023/0027216 A1 Jan. 26, 2023

(51) Int. Cl.
*G06F 18/40* (2023.01)
*G06T 19/00* (2011.01)
(Continued)

(52) U.S. Cl.
CPC ............ *G06F 18/40* (2023.01); *G06F 18/214* (2023.01); *G06F 18/217* (2023.01); *G06N 20/00* (2019.01);
(Continued)

(58) Field of Classification Search
CPC ...... G06F 18/40; G06F 18/214; G06F 18/217; G06N 20/00; G06T 19/006; G06T 19/20;
(Continued)

(56) References Cited

U.S. PATENT DOCUMENTS

| | | | |
|---|---|---|---|
| 9,972,137 | B2 | 5/2018 | Petrovskaya |
| 2017/0304732 | A1 | 10/2017 | Velic |

(Continued)

FOREIGN PATENT DOCUMENTS

| | | |
|---|---|---|
| CN | 110751148 A | 2/2020 |
| CN | 112966587 A | 6/2021 |

(Continued)

OTHER PUBLICATIONS

Alhaija et al., "Augmented Reality Meets Deep Learning for Car Instance Segmentation in Urban Scenes", Proceedings of the British Machine Vision Conference, London, UK, Sep. 2017, 12 Pages.

(Continued)

*Primary Examiner* — Chong Wu
(74) *Attorney, Agent, or Firm* — Stephanie L. Carusillo

(57) ABSTRACT

In an approach for creating synthetic visual inspection data sets for training an artificial intelligence computer vision deep learning model utilizing augmented reality, a processor enables a user to capture a plurality of images of an anchor object using a camera on a user computing device. A processor receives the plurality of images of the anchor object from the user. A processor generates a baseline model of an anchor object. A processor generates a training data set. A processor trains the baseline model of the anchor object. A processor creates a trained Artificial Intelligence (AI) computer vision deep learning model. A processor enables the user to interact with the trained AI computer vision deep learning model in an access mode.

20 Claims, 8 Drawing Sheets

(51) Int. Cl.
　　　*G06T 19/20*　　(2011.01)
　　　*G06N 20/00*　　(2019.01)
　　　*G06V 20/20*　　(2022.01)
　　　*G06F 18/214*　　(2023.01)
　　　*G06F 18/21*　　(2023.01)
(52) U.S. Cl.
　　　CPC .......... *G06T 19/006* (2013.01); *G06T 19/20* (2013.01); *G06V 20/20* (2022.01); *G06T 2200/24* (2013.01); *G06T 2219/2016* (2013.01)
(58) Field of Classification Search
　　　CPC ........ G06T 2200/24; G06T 2219/2016; G06V 20/20; G06V 10/774; G06V 20/64
　　　See application file for complete search history.

(56) References Cited

U.S. PATENT DOCUMENTS

| | | | |
|---|---|---|---|
| 2019/0102646 | A1 | 4/2019 | Redmon |
| 2019/0258878 | A1 | 8/2019 | Koivisto |
| 2020/0019794 | A1 | 1/2020 | Engelcke |
| 2020/0342242 | A1 | 10/2020 | Avidan |
| 2022/0237336 | A1* | 7/2022 | Zhao ................... G06N 3/08 |
| 2022/0406066 | A1* | 12/2022 | Rangarajan ........... G08B 21/10 |

FOREIGN PATENT DOCUMENTS

| | | | |
|---|---|---|---|
| WO | 2018184187 | A1 | 10/2018 |
| WO | 2021137111 | A1 | 7/2021 |

OTHER PUBLICATIONS

Apple Developer, "Scanning and Detecting 3D Objects", Apple Inc., Accessed on Apr. 16, 2021, 7 Pages.

Chaichulee et al., "Multi-Task Convolutional Neural Network for Patient Detection and Skin Segmentation in Continuous Non-Contact Vital Sign Monitoring", 2017 12th IEEE International Conference on Automatic Face & Gesture Recognition, Washington, DC, 2017, 7 Pages.

Crispell et al., "Dataset Augmentation for Pose and Lighting Invariant Face Recognition," arXiv:1704.04326v1 [cs.CV], Apr. 14, 2017, 9 Pages.

Gawryluk, Michal, "Synthetic data for deep learning", LogicAI, 2020, 9 Pages.

Immerman, David, "Working Together: Computer Vision, AI, and Augmented Reality", PTC Blog, Nov. 13, 2019, 6 Pages.

Keshavarzi et al., "GenScan: A Generative Method for Populating Parametric 3D Scan Datasets", arXiv:2012.03998v1 [cs.CV], Dec. 7, 2020, 11 Pages.

Lampropoulos et al., "Enhancing the functionality of augmented reality using deep learning, semantic web and knowledge graphs: A review", Visual Informatics, vol. 4, Issue 1, Mar. 2020, 11 Pages.

Payumo et al., "Augmented reality data generation for training deep learning neural network", Proceedings vol. 10649, Pattern Recognition and Tracking XXIX, 106490U, Apr. 30, 2018, 11 Pages.

Sakkos et al., "Illumination-Based Data Augmentation for Robust Background Subtraction", arXiv:1910.08470v1 [cs.CV], Oct. 18, 2019, 8 Pages.

Schraml, Dominik, "Physically based synthetic image generation for machine learning: a review of pertinent literature", Proceedings vol. 11144, Photonics and Education in Measurement Science 2019, 111440J, Sep. 17, 2019, 14 Pages.

Shorten et al., "A survey on Image Data Augmentation for Deep Learning", Journal of Big Data 6, Article No. 60, Jul. 6, 2019, 48 Pages.

Zidek et al., "An Automated Training of Deep Learning Networks by 3D Virtual Models for Object Recognition", Symmetry, vol. 11, Issue 4, Apr. 5, 2019, 16 Pages.

"Patent Cooperation Treaty PCT International Search Report", Applicant's File Reference: PF220500PCT, International Application No. PCT/CN2022/106189, International Filing Date: Jul. 18, 2022, dated Oct. 10, 2022, 9 pages.

\* cited by examiner

CREATING SYNTHETIC VISUAL INSPECTION DATA SETS USING AUGMENTED REALITY

BACKGROUND OF THE INVENTION

The present invention relates generally to the field of data processing, and more particularly to creating synthetic visual inspection data sets for training an artificial intelligence computer vision deep learning model utilizing augmented reality.

Machine learning is a branch of artificial intelligence (AI) and computer science which focuses on the use of algorithms and statistical methods, rather than on explicit programming, to analyze, classify, and draw inferences, while gradually improving accuracy. From the inferences drawn, key insights within data mining projects are uncovered. These insights subsequently drive decision making within applications and businesses, ideally impacting key growth metrics.

Deep learning is a specific method of machine learning. Deep learning incorporates neural networks into multiple successive layers. The multiple successive layers are used to progressively extract higher-level features from the raw input in an iterative manner. The complex neural networks formed emulate how a human brain works. In a similar manner as the human brain, computers are trained to and deal with abstractions and problems that are poorly defined.

Deep learning automates much of the higher-level feature extraction pieces of the process, eliminating some of the manual human intervention required and enabling the use of larger datasets. Deep learning leverages the larger datasets to inform its algorithm. The algorithm can ingest unstructured data in its raw form (e.g., text and images) and can automatically determine the set of features which distinguish one category of data from another.

Deep learning is primarily credited with accelerating progress in areas, such as computer vision, natural language processing, and speech recognition. For example, in an image processing application, each layer learns to transform its input data into a slightly more abstract and composite representation. In an image recognition application, the raw input may be a matrix of pixels; the first layer may abstract the pixels and encode the edges; the second layer may compose and encode arrangements of the edges; the third layer may encode a nose and eyes; and the fourth layer may recognize that the image contains a face. The deep learning process learns to optimally place features in levels on its own.

The model training process follows a rather standard framework. First, a large number of data points and their corresponding labels are collected; second, the data points and their corresponding labels are split into training, validation, and test sets; third, the model is trained using the training set; fourth, the accuracy of the validation and test sets are measured; and fifth, the model is deployed into production.

The model training process, however, can be problematic. The training, validation, and test sets are assembled to match real life situations that may occur when the model is used in production. The production data, however, may be very different from the training, validation, or test data used. Additionally, if too small of a data set is used during the model training process, then a model may "overfit" the set and perform poorly when presented with real life scenarios. For example, in a computer vision application, situations with very slight variations in light or orientation might drastically affect the performance of a model.

Data augmentation is a technique used to produce a training set that will match varied conditions, such as differences in lighting, camera orientation, or color. Most state-of-the-art object detection models or image classification models require example images for each of the situations that the model will detect. Traditional image manipulation (i.e., crop, flip, rotate, hue, saturation, etc.) will not help in these situations. Data augmentation, however, can increase the amount of data by adding slightly modified copies of already existing data or by creating new synthetic data from existing data. Data augmentation acts as a regulator and helps reduce overfitting when training a machine learning model. Further, data augmentation uses geometric transformations, flipping, color modification, cropping, rotation, noise injection, and random erasing to augment an image.

SUMMARY

Aspects of an embodiment of the present invention disclose a method, computer program product, and computer system for creating synthetic visual inspection data sets for training an artificial intelligence computer vision deep learning model utilizing augmented reality. A processor enables a user to capture a plurality of images of an anchor object using a camera on a user computing device. A processor receives the plurality of images of the anchor object from the user. A processor generates a baseline model of an anchor object. A processor generates a training data set. A processor trains the baseline model of the anchor object. A processor creates a trained Artificial Intelligence (AI) computer vision deep learning model. A processor enables the user to interact with the trained AI computer vision deep learning model in an access mode.

In some aspects of an embodiment of the present invention, a processor finds an anchor point of the anchor object. A processor creates an Augmented Reality (AR) Reference Object of the anchor object. A processor converts the AR Reference Object of the anchor object into a three-dimensional (3D) model of the anchor object in USDZ format. A processor downloads the AR Reference Object of the anchor object and the 3D model of the anchor object onto the user computing device.

In some aspects of an embodiment of the present invention, a processor displays the 3D model of the anchor object for the user on a user interface of the user computing device as the anchor object would appear in AR upon detecting the anchor object in a real-world scenario. A processor enables the user to adjust a size of the 3D model of the anchor object.

In some aspects of an embodiment of the present invention, a processor searches for an object in a scene using the camera on the user computing device. A processor detects the object in the scene. A processor superimposes the AR Reference Object of the anchor object detected in the scene to confirm that the object found in the scene is the anchor object. A processor loads one or more associated 3D models of target objects from a database. A processor enables the user to select the one or more associated 3D models of the target objects on the user interface of the user computing device. A processor enables the user to orient the one or more associated 3D models of the target objects selected relative to the anchor object using data augmentation through the user interface of the user computing device. A processor calculates a xyz-ptz location of the one or more associated 3D models of the target objects selected relative to the anchor object. A processor saves an orientation of the one or more associated 3D models of the target objects in the database. A processor determines the selection and the orientation of the one or more associated 3D models of the target objects is complete. A processor enables the user to capture one or more additional baseline images of the scene using the camera on the user computing device. A processor produces one or more training images of the one or more baseline images of the scene. A processor produces one or more training images of the anchor object. A processor produces one or more training images of the target objects selected. A processor uploads to a training dataset the one or more training images of the one or more baseline images produced of the scene and metadata associated with the one or more training images of the one or more baseline images produced of the scene; the one or more training images of the anchor object and metadata associated with the one or more training images of the anchor object; the one or more training images of the target objects and metadata associated with the one or more training images of the target objects; the xyz-ptz location of the one or more associated 3D models of the target objects relative to the anchor object; the orientation of the one or more associated 3D models of the target objects; and one or more user-inputted parameters.

In some aspects of an embodiment of the present invention, data augmentation includes moving, rotating, removing, and re-texturing the one or more associated 3D models of the target objects relative to the anchor object to increase the size of the training dataset.

In some aspects of an embodiment of the present invention, a processor receives an input. A processor overlays the one or more associated 3D models of the target objects on the scene. A processor permutes the one or more associated 3D models of the target objects randomly based on one or more function inputs received from the user. A processor enables the user to resize the one or more associated 3D models of the target objects. A processor enables the user to rotate the one or more associated 3D models of the target objects. A processor enables the user to adjust one or more types of lighting illuminating the one or more associated 3D models of the target objects. A processor captures one or more augmentation images of the one or more associated 3D models of the target objects superimposed on the scene. A processor compares the one or more augmentation images to previously captured augmentation images stored in the database.

In some aspects of an embodiment of the present invention, the input includes the one or more training images of the one or more baseline images of the scene, the one or more training images of the anchor object, the one or more training images of the target objects selected, the training data set created, data on a position of the one or more associated 3D models of the target objects relative to the anchor object, and user-inputted parameters.

In some aspects of an embodiment of the present invention, a processor enables the user to select a training mode or a validation mode using the user interface on the user computing device. A processor receives a response regarding the mode selected by the user. A processor determines whether the user selected the validation mode from the response received. A processor completes an inference on the one or more augmentation images. A processor outputs one or more results of the inference on the one or more augmentation images to the user through the user interface of the user computing device. A processor enables the user to review the one or more results of the inference on the one or more augmentation images. A processor enables the user to accept or to reject the trained AI computer vision deep learning model and an associated training data set. A processor determines the user accepted the trained AI computer vision deep learning model and the associated training data set. A processor marks the trained AI computer vision deep learning model and the associated training data set as ready for use.

DETAILED DESCRIPTION

Figure 1:
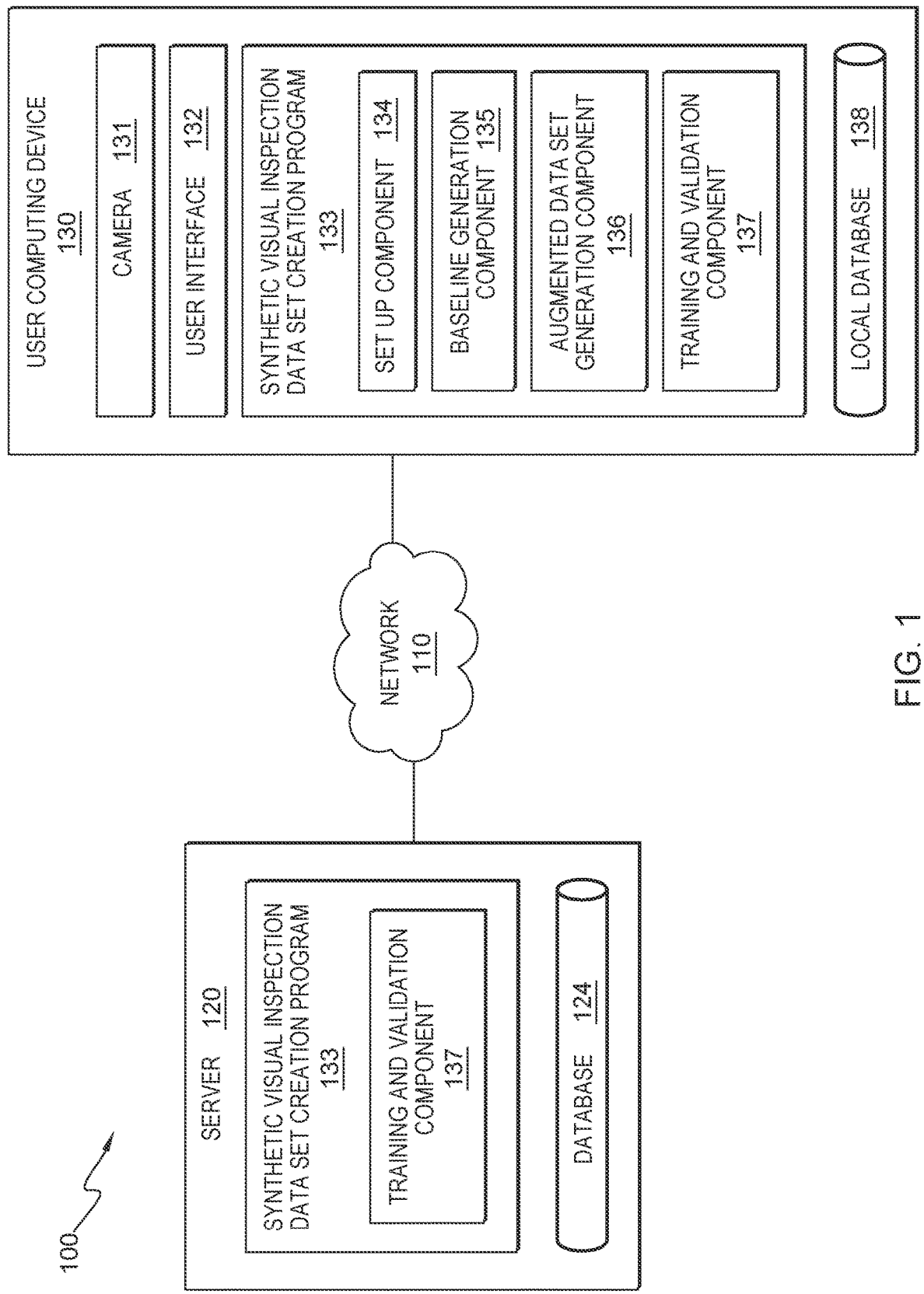
FIG. 1 is a functional block diagram illustrating a distributed data processing environment, in accordance with an embodiment of the present invention.

Embodiments of the present invention recognize that the model training process can be problematic. Training, validation, and test sets are assembled to match real life situations that may occur post-assembly when a model is used in production. The production data, however, may be very different from the data seen during the training, validation, or testing process. Embodiments of the present invention also recognize that if too small of a data set is used during the model training process, then a model may overfit the set and perform poorly when presented with real life scenarios.

Embodiments of the present invention recognize that, in a computer vision application, situations with very slight variations in light or orientation might drastically affect the performance of a model. For example, a computer vision model is attempting to recognize whether a connector is plugged correctly. If the connector is not plugged correctly, the computer vision model will flag the error as a "partial seating," a "missing connector," or a "complete disconnect." Traditional image manipulation (i.e., crop, flip, rotate, hue, saturation, etc.) will not help the computer vision model generalize for conditions like a wire dangling, a pin not being seated in a socket properly, or the various other ways something might not be joined correctly. Therefore, embodiments of the present invention recognize that users need a way to train the model in these types of situations.

Embodiments of the present invention provide a system and method to create synthetic visual inspection data sets for training an AI computer vision model utilizing augmented reality. Embodiments of the present invention create an augmented reality (AR) point cloud of an anchor object comprised of a plurality of sub-objects. A point cloud is a set of data points arranged in space. Each data point has a set of Cartesian coordinates (X, Y, and Z). Depending on their density, the data points can be used to visualize the external surface of a shape, an object, or an environment. The AR point cloud of the anchor object is used to create a computer vision model that will be used to find and examine three-dimensional (3D) computer-aided design (CAD) models of manufactured parts. A computer vision model is a processing block that takes uploaded inputs, such as images or videos, and predicts and returns pre-learned concepts or labels. The computer vision model is built by, first, creating a dataset comprised of annotated images; second, extracting features pertinent to the task at hand from each image; third, training a deep learning model based on the isolated features; and fourth, evaluating the model using images that weren't used in the training phase to test the accuracy of the model.

Embodiments of the present invention capture orientation data (i.e., x, y, z, yaw, pitch, and roll) of a camera on a user computing device when a user aims the camera at a target object within the anchor object (e.g., a connector on a door). Along with the orientation data, training images of the assembly of the anchor object are captured.

Embodiments of the present invention create the AR reference object of the anchor object. Embodiments of the present invention convert the AR reference object of the anchor object to create the 3D model of the anchor object.

Embodiments of the present invention enable the user to select one or more associated 3D models of target objects and to orient the one or more associated 3D models of target objects relative to the position of the anchor object using data augmentation. Embodiments of the present invention generate a newly created training data set or to update an already existing training data set with one or more training images and the metadata associated with the one or more training images.

Embodiments of the present invention randomly permute (e.g., moves, removes, rotates, or re-textures) the one or more associated 3D models of the target objects. Embodiments of the present invention capture one or more augmentation images of the one or more associated 3D models of the target objects superimposed on the scene as the one or more associated 3D models of the target objects are randomly permuted. Embodiments of the present invention compare the one or more augmentation images to previously captured augmentation images to understand the performance of the augmentation. Embodiments of the present invention update the baseline model of the anchor object utilizing the captured images, tuning parameters, and augmentation algorithms. Embodiments of the present invention train the baseline model of the anchor object to create a trained AI computer vision deep learning model that can identify the anchor object in a 3D representation.

Embodiments of the present invention enable the user to interact with the trained AI computer vision deep learning model in an access mode by superimposing the one or more associated 3D models of the target objects on the anchor object.

For example, with the 3D CAD model of the manufactured part, the user can overlay the target object on top of the real image and create situations that might occur, including random variations, e.g., a connector might be fully-seated (0 millimeters out of place) or fully-disconnected (10 millimeters out of place). Embodiments of the present invention create intermediate variations of the connector in various intervals of 1 mm, 2 mm, etc. Embodiments of the present invention enable the user to rapidly create and iterate on augmented data sets scenarios that match the real-life scenarios that the 3D CAD model will encounter in production by providing real-time feedback to the user on the user computing device.

Implementation of embodiments of the present invention may take a variety of forms, and exemplary implementation details are discussed subsequently with reference to the Figures.

FIG. 1 is a functional block diagram illustrating a distributed data processing environment, generally designated 100, in accordance with an embodiment of the present invention. In the depicted embodiment, distributed data processing environment 100 includes server 120 and user computing device 130, interconnected over network 110. Distributed data processing environment 100 may include additional servers, computers, computing devices, IoT sensors, and other devices not shown. The term "distributed" as used herein describes a computer system that includes multiple, physically distinct devices that operate together as a single computer system. FIG. 1 provides only an illustration of one embodiment of the present invention and does not imply any limitations with regard to the environments in which different embodiments may be implemented. Many modifications to the depicted environment may be made by those skilled in the art without departing from the scope of the invention as recited by the claims.

Network 110 operates as a computing network that can be, for example, a telecommunications network, a local area network (LAN), a wide area network (WAN), such as the Internet, or a combination of the three, and can include wired, wireless, or fiber optic connections. Network 110 can include one or more wired and/or wireless networks capable of receiving and transmitting data, voice, and/or video signals, including multimedia signals that include data, voice, and video information. In general, network 110 can be any combination of connections and protocols that will support communications between server 120, user computing device 130, and other computing devices (not shown) within distributed data processing environment 100.

Server 120 operates to send and/or store data in database 124. In an embodiment, server 120 can send data from database 124 to user computing device 130. In an embodiment, server 120 can receive data in database 124 from user computing device 130. In some embodiments, server 120 operates to run training and validation component 137 of synthetic visual inspection data set creation program 133. In one or more embodiments, server 120 can be a standalone computing device, a management server, a web server, a mobile computing device, or any other electronic device or computing system capable of receiving, sending, and processing data and capable of communicating with user computing device 130 via network 110. In one or more embodiments, server 120 can be a computing system utilizing clustered computers and components (e.g., database server computers, application server computers, etc.) that act as a single pool of seamless resources when accessed within distributed data processing environment 100, such as in a cloud computing environment. In one or more embodiments, server 120 can be a laptop computer, a tablet computer, a netbook computer, a personal computer, a desktop computer, a personal digital assistant, a smart phone, or any programmable electronic device capable of communicating with user computing device 130 and other computing devices (not shown) within distributed data processing environment 100 via network 110. Server 120 may include internal and external hardware components, as depicted and described in further detail in FIG. 8.

Database 124 operates as a repository for data received, used, and/or generated by synthetic visual inspection data set creation program 133. A database is an organized collection of data. Data includes, but is not limited to, one or more augmentation images and any other data received, used, and/or generated by synthetic visual inspection data set creation program 133. Database 124 can be implemented with any type of device capable of storing data and configuration files that can be accessed and utilized by server 120, such as a hard disk drive, a database server, or a flash memory. In an embodiment, database 124 is accessed by synthetic visual inspection data set creation program 133 to store and/or to access the data. In the depicted embodiment, database 124 resides on server 120. In another embodiment, database 124 may reside on another computing device, server, cloud server, or spread across multiple devices elsewhere (not shown) within distributed data processing environment 100, provided that synthetic visual inspection data set creation program 133 has access to database 124.

User computing device 130 operates to run synthetic visual inspection data set creation program 133 and to store and/or send data using local database 138. User computing device 130 also operates to run user interface 132 through which a user can interact with synthetic visual inspection data set creation program 133 on server 120 and on user computing device 130. In an embodiment, user computing device 130 is a device that performs programmable instructions. For example, user computing device 130 may be an electronic device, such as a laptop computer, a tablet computer, a netbook computer, a personal computer, a desktop computer, a smart phone, or any programmable electronic device capable of running user interface 132 and of communicating (i.e., sending and receiving data) with synthetic visual inspection data set creation program 133 via network 110. In general, user computing device 130 represents any programmable electronic device or a combination of programmable electronic devices capable of executing machine readable program instructions and communicating with other computing devices (not shown) within distributed data processing environment 100 via network 110. In the depicted embodiment, user computing device 130 includes an instance of camera 131, user interface 132, synthetic visual inspection data set creation program 133, set up component 134, baseline generation component 135, augmented data set generation component 136, training and validation component 137, and local database 138. User computing device 130 may include components as described in further detail in FIG. 8.

User interface 132 operates as a local user interface between synthetic visual inspection data set creation program 133 on server 120 and a user of user computing device 130. User interface 132 also operates as a local user interface between synthetic visual inspection data set creation program 133 on user computing device 130 and a user of user computing device 130. In some embodiments, user interface 132 is a graphical user interface (GUI), a web user interface (WUI), and/or a voice user interface (VUI) that can display (i.e., visually) or present (i.e., audibly) text, documents, web browser windows, user options, application interfaces, and instructions for operations sent from synthetic visual inspection data set creation program 133 to a user via network 110. User interface 132 can also display or present alerts including information (such as graphics, text, and/or sound) sent from synthetic visual inspection data set creation program 133 to a user via network 110. In an embodiment, user interface 132 is capable of sending and receiving data (i.e., to and from synthetic visual inspection data set creation program 133 via network 110, respectively). Through user interface 132, a user can opt-in to synthetic visual inspection data set creation program 133; create a user profile; and set user preferences and alert notification preferences.

A user preference is a setting that can be customized for a particular user. A set of default user preferences are assigned to each user of synthetic visual inspection data set creation program 133. A user preference editor can be used to update values to change the default user preferences. User preferences that can be customized include, but are not limited to, general user system settings, specific user profile settings for synthetic visual inspection data set creation program 133, alert notification settings, and machine learning data collection/storage settings. Machine learning data includes, but is not limited to, data regarding past results of iterations of synthetic visual inspection data set creation program 133 and a user's previous response to an alert notification sent by synthetic visual inspection data set creation program 133, images captured by synthetic visual inspection data set creation program 133, and annotations from the user.

Synthetic visual inspection data set creation program 133 operates to create synthetic visual inspection data sets for training an AI computer vision deep learning model utilizing augmented reality. In the depicted embodiment, synthetic visual inspection data set creation program 133 contains set up component 134, baseline generation component 135, augmented data set generation component 136, and training and validation component 137. In the depicted embodiment, synthetic visual inspection data set creation program 133 is a standalone program. In another embodiment, synthetic visual inspection data set creation program 133 may be integrated into another software product. In the depicted embodiment, synthetic visual inspection data set creation program 133 resides on server 120 and on user computing device 130. In another embodiment, synthetic visual inspection data set creation program 133 may reside only on user computing device 130 or on another computing device (not shown), provided that synthetic visual inspection data set creation program 133 has access to network 110.

In an embodiment, a user opts-in to synthetic visual inspection data set creation program 133 and sets up a user profile with synthetic visual inspection data set creation program 133. The operational steps of setup component 134 of synthetic visual inspection data set creation program 133 are depicted and described in further detail with respect to FIG. 2. The overall operational steps of synthetic visual inspection data set creation program 133 are depicted and described in further detail with respect to FIG. 3. The operational steps of baseline generation component 135 of synthetic visual inspection data set creation program 133 are depicted and described in further detail with respect to FIG. 4. The operational steps of augmented data set generation component 136 of synthetic visual inspection data set creation program 133 are depicted and described in further detail with respect to FIG. 5. The operational steps of training and validation component 137 of synthetic visual inspection data set creation program 133 are depicted and described in further detail with respect to FIG. 6. The operational steps of training and validation component 137 of synthetic visual inspection data set creation program 133 are further depicted and described in further detail with respect to FIG. 7.

In an embodiment, the user of user computing device 130 can register with server 120 (e.g., via a corresponding application). For example, the user completes a registration process, provides information, and authorizes the collection and analysis (i.e., opts-in) of relevant data on identified computing devices (e.g., user computing device 130) by server 120 (e.g., via synthetic visual inspection data set creation program 133). In various embodiments, a user can opt-in or opt-out of certain categories of data collection. For example, the user can opt-in to provide all requested information, a subset of requested information, or no information. In one example scenario, the user opts-in to provide time-based information, but opts-out of providing location-based information (on all or a subset of computing devices associated with the user). Such preferences can be stored in database 124 or local database 138.

Local database 138 operates as a repository for data received, used, and/or generated by synthetic visual inspection data set creation program 133. Data includes, but is not limited to, a plurality of scanned images; an AR reference object; a 3D model of an anchor object; one or more associated 3D models of target objects selected and orientated; an xyz-ptz location of the one or more associated 3D models of the target objects; an orientation of the one or more associated 3D models of the target objects; a newly created training data set; an already existing training data set; user-inputted parameters; one or more augmentation images; and any other data received, used, and/or generated by synthetic visual inspection data set creation program 133. Local database 138 can be implemented with any type of device capable of storing data and configuration files that can be accessed and utilized by user computing device 130, synthetic visual inspection data set creation program 133, and/or server 120. In the depicted embodiment, local database 138 resides on user computing device 130. In another embodiment, local database 138 may be combined with database 124 or may reside on another computing device, server, cloud server, or spread across multiple devices elsewhere (not shown) within distributed data processing environment 100, provided that synthetic visual inspection data set creation program 133 has access to network 110.

Figure 2:
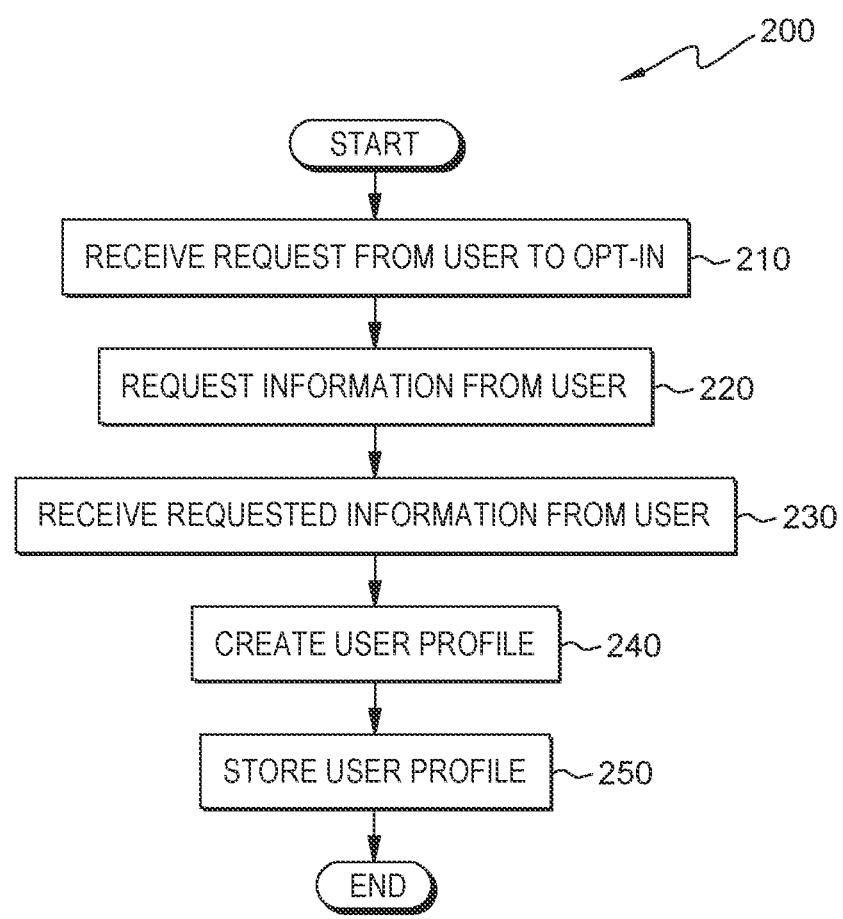
FIG. 2 is a flowchart illustrating the operational steps for a setup component of a synthetic visual inspection data set creation program, on a user computing device within the distributed data processing environment of FIG. 1, in accordance with an embodiment of the present invention.

FIG. 2 is a flowchart, generally designated 200, illustrating the operational steps for setup component 134 of synthetic visual inspection data set creation program 133 on user computing device 130 within distributed data processing environment 100 of FIG. 1, in accordance with an embodiment of the present invention. In an embodiment, setup component 134 of synthetic visual inspection data set creation program 133 completes a one-time setup with a user. The one-time setup allows for setup component 134 of synthetic visual inspection data set creation program 133 to capture relevant information about the user to create a user profile. In an embodiment, setup component 134 of synthetic visual inspection data set creation program 133 receives a request from the user to opt-in. In an embodiment, setup component 134 of synthetic visual inspection data set creation program 133 requests information from the user. In an embodiment, setup component 134 of synthetic visual inspection data set creation program 133 receives the requested information from the user. In an embodiment, setup component 134 of synthetic visual inspection data set creation program 133 creates a user profile. In an embodiment, setup component 134 of synthetic visual inspection data set creation program 133 stores the user profile. It should be appreciated that the process depicted in FIG. 2 illustrates one possible iteration of setup component 134 of synthetic visual inspection data set creation program 133, which may be repeated for each opt-in request received by setup component 134 of synthetic visual inspection data set creation program 133.

In step 210, setup component 134 of synthetic visual inspection data set creation program 133 receives a request from a user to opt-in. A user may include, but is not limited to, a quality engineer, a manufacturing line operator or supervisor, a mechanical engineer, or an integration engineer or specialist. In an embodiment, setup component 134 of synthetic visual inspection data set creation program 133 receives a request from a user to opt-in to synthetic visual inspection data set creation program 133. In an embodiment, setup component 134 of synthetic visual inspection data set creation program 133 receives a request from a user to opt-in to synthetic visual inspection data set creation program 133 through user interface 132 of user computing device 130. By opting-in, the user agrees to share data with database 124 and local database 138.

In step 220, setup component 134 of synthetic visual inspection data set creation program 133 requests information. In an embodiment, responsive to receiving the request from the user to opt-in, setup component 134 of synthetic visual inspection data set creation program 133 requests information. In an embodiment, setup component 134 of synthetic visual inspection data set creation program 133 requests information from the user through user interface 132 of user computing device 130. Information requested from the user by setup component 134 of synthetic visual inspection data set creation program 133 includes, but is not limited to, information about user preferences (e.g., general user system settings for user computing device 130); information about alert notification preferences; and information necessary to create a user profile (e.g., name and location of user computing device 130).

In an embodiment, setup component 134 of synthetic visual inspection data set creation program 133 requests access to camera 131 on user computing device 130. In an embodiment, setup component 134 of synthetic visual inspection data set creation program 133 requests access to camera 131 on user computing device 130 to capture a plurality of images to be used when conducting inspections. In another embodiment, setup component 134 of synthetic visual inspection data set creation program 133 requests access to camera 131 on user computing device 130 to search a scene for an object.

In an embodiment, setup component 134 of synthetic visual inspection data set creation program 133 requests access to a photo album on user computing device 130. In an embodiment, setup component 134 of synthetic visual inspection data set creation program 133 requests access to a photo album from where setup component 134 of synthetic visual inspection data set creation program 133 can pull images to be used during an inspection. In an embodiment, setup component 134 of synthetic visual inspection data set creation program 133 requests access to a photo album where setup component 134 of synthetic visual inspection data set creation program 133 can store images previously used during an inspection. In an embodiment, setup component 134 of synthetic visual inspection data set creation program 133 enables a user to allow setup component 134 of synthetic visual inspection data set creation program 133 access to select photos, to all photos, or to no photos. In an embodiment, setup component 134 of synthetic visual inspection data set creation program 133 requests access to a photo album through user interface 132 of user computing device 130.

In step 230, setup component 134 of synthetic visual inspection data set creation program 133 receives the requested information from the user. In an embodiment, responsive to requesting information, setup component 134 of synthetic visual inspection data set creation program 133 receives the requested information from the user. In an embodiment, setup component 134 of synthetic visual inspection data set creation program 133 receives the requested information from the user through user interface 132 of user computing device 130.

In step 240, setup component 134 of synthetic visual inspection data set creation program 133 creates a user profile. In an embodiment, responsive to receiving the requested information from the user, setup component 134 of synthetic visual inspection data set creation program 133 creates a user profile. In an embodiment, setup component 134 of synthetic visual inspection data set creation program 133 creates a user profile for the user. In an embodiment, setup component 134 of synthetic visual inspection data set creation program 133 creates a user profile with information input by the user during setup regarding the user as well as user preferences and alert notification preferences of the user.

In step 250, setup component 134 of synthetic visual inspection data set creation program 133 stores the user profile. In an embodiment, responsive to creating the user profile, setup component 134 of synthetic visual inspection data set creation program 133 stores the user profile. In an embodiment, setup component 134 of synthetic visual inspection data set creation program 133 stores the user profile in a database, e.g., database 124 and/or local database 138.

Figure 3:
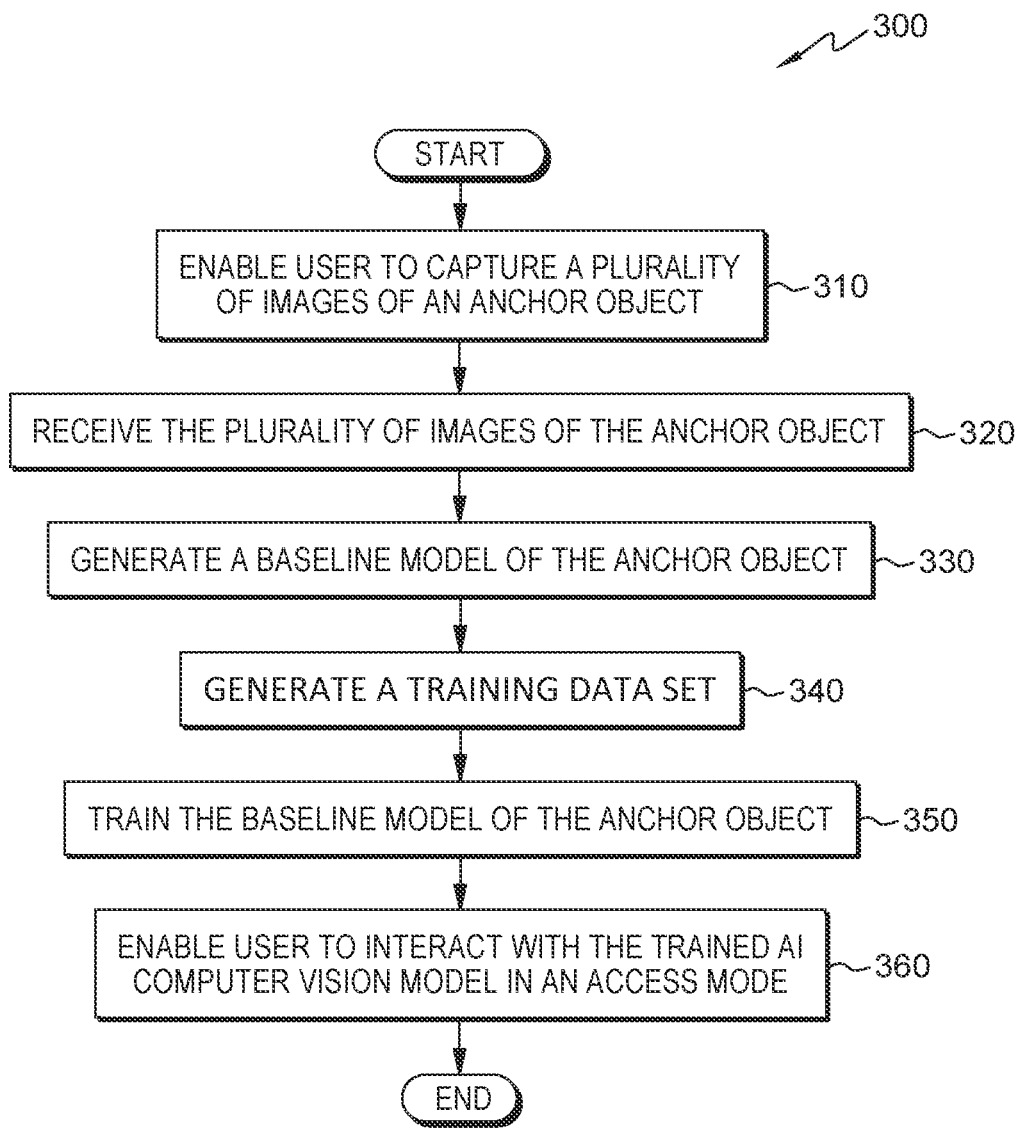
FIG. 3 is a flowchart illustrating the operational steps of the synthetic visual inspection data set creation program, on the user computing device within the distributed data processing environment of FIG. 1, in accordance with an embodiment of the present invention.

FIG. 3 is a flowchart, generally designated 300, illustrating the operational steps of synthetic visual inspection data set creation program 133 on user computing device 130 in distributed data processing environment 100 of FIG. 1, in accordance with an embodiment of the present invention. In an embodiment, synthetic visual inspection data set creation program 133 operates to create synthetic visual inspection data sets for training an AI computer vision model utilizing AR. It should be appreciated that the process depicted in FIG. 3 illustrates one possible iteration of synthetic visual inspection data set creation program 133, which may be repeated for each AI computer vision deep learning model trained by synthetic visual inspection data set creation program 133.

In step 310, synthetic visual inspection data set creation program 133 enables the user to capture a plurality of images of an anchor object. The anchor object is a known fixed reference object comprised of a plurality of sub-objects. The anchor object makes up the background of a scene, therefore, it will always be present. The anchor object, for example, may be a door panel, a car engine, a large component of a machine, or an entire electronic assembly. In an embodiment, synthetic visual inspection data set creation program 133 enables the user to capture a plurality of images of the anchor object using camera 131 of user computing device 130. In an embodiment, synthetic visual inspection data set creation program 133 enables the user to capture a plurality of images of the anchor object using an application on user computing device 130. In an embodiment, synthetic visual inspection data set creation program 133 enables a user to capture a plurality of images of the anchor object at one or more distances. In an embodiment, synthetic visual inspection data set creation program 133 enables a user to capture a plurality of images of the anchor object from one or more angles. In an embodiment, synthetic visual inspection data set creation program 133 enables a user to capture a plurality of images of the anchor object under one or more types of lighting.

In an embodiment, synthetic visual inspection data set creation program 133 creates a bounding box surrounding the anchor object. The bounding box is an expression of the maximum extents of a 2-dimensional object or set of objects within a 2-dimensional (i.e., x, y) coordinate system (i.e., min(x), max(x), min(y), max(y)). In an embodiment, synthetic visual inspection data set creation program 133 displays the bounding box surrounding the anchor object to indicate when the user has captured enough spatial data (i.e., from the plurality of images) of the anchor object for synthetic visual inspection data set creation program 133 to recognize the anchor object from a corresponding direction.

In an embodiment, synthetic visual inspection data set creation program 133 displays the bounding box surrounding the anchor object on user interface 132 of user computing device 130. In an embodiment, synthetic visual inspection data set creation program 133 displays the bounding box surrounding the anchor object on user interface 132 of user computing device 130 to estimate the size of the anchor object appearing in camera 131 on user computing device 130.

In another embodiment, synthetic visual inspection data set creation program 133 runs a session with ARObjectScanningConfiguration. In an embodiment, synthetic visual inspection data set creation program 133 runs a session with ARObjectScanningConfiguration to identify an anchor object. In an embodiment, synthetic visual inspection data set creation program 133 scans the anchor object from one or more angles to ensure enough spatial data is collected to recognize the anchor object. In an embodiment, synthetic visual inspection data set creation program 133 calls createReferenceObject (transform:center:extent:completionHandler:) to produce an AR reference object from a region of the user's environment mapped during the session.

In step 320, synthetic visual inspection data set creation program 133 receives the plurality of images. In an embodiment, responsive to enabling a user to capture the plurality of images of the anchor object, synthetic visual inspection data set creation program 133 receives the plurality of images. In an embodiment, synthetic visual inspection data set creation program 133 receives the plurality of images of the anchor object. In an embodiment, synthetic visual inspection data set creation program 133 receives the plurality of images of the anchor object from the user. In an embodiment, synthetic visual inspection data set creation program 133 stores the plurality of images of the anchor object in a database, e.g., local database 138.

For example, synthetic visual inspection data set creation program 133 receives a plurality of images of the anchor object, i.e., a door panel. In another example, synthetic visual inspection data set creation program 133 receives a plurality of images of the anchor object, i.e., a car engine. In yet another example, synthetic visual inspection data set creation program 133 receives a plurality of images of the anchor object, i.e., a large component of a pump. In yet another example, synthetic visual inspection data set creation program 133 receives a plurality of images of the anchor object, i.e., an entire electronic assembly.

In step 330, synthetic visual inspection data set creation program 133 generates a baseline model of the anchor object. In an embodiment, responsive to receiving the plurality of images, synthetic visual inspection data set creation program 133 generates a baseline model of the anchor object. In an embodiment, synthetic visual inspection data set creation program 133 creates an AR reference object of the anchor object. In an embodiment, synthetic visual inspection data set creation program 133 converts the AR reference object of the anchor object to a 3D model of the anchor object. The AR reference object of the anchor object and the 3D model of the anchor object are hereinafter referred to as the baseline model of the anchor object. Step 330 is described in further detail with respect to flowchart 400 in FIG. 4.

In step 340, synthetic visual inspection data set creation program 133 generates a training data set. In an embodiment, responsive to generating the baseline model of the anchor object, synthetic visual inspection data set creation program 133 generates a training data set. In an embodiment, synthetic visual inspection data set creation program 133 generates a training data set with one or more training images and metadata associated with the one or more training images. In another embodiment, synthetic visual inspection data set creation program 133 updates an already existing training data set. In an embodiment, synthetic visual inspection data set creation program 133 updates an already existing training data set with one or more training images and metadata associated with the one or more training images. Step 340 is described in further detail with respect to flowchart 500 in FIG. 5.

In step 350, synthetic visual inspection data set creation program 133 trains the baseline model of the anchor object. In an embodiment, responsive to generating a training data set, synthetic visual inspection data set creation program 133 trains the baseline model of the anchor object. In an embodiment, synthetic visual inspection data set creation program 133 trains the baseline model of the anchor object to create a trained AI computer vision deep learning model that can identify the anchor object in a 3D representation. Step 350 is described in further detail with respect to flowchart 600 in FIG. 6.

In step 360, synthetic visual inspection data set creation program 133 enables a user to interact with the trained AI computer vision deep learning model in an access mode. In an embodiment, responsive to training an AI computer vision deep learning model, synthetic visual inspection data set creation program 133 enables a user to interact with the trained AI computer vision deep learning model in an access mode. The access mode is either a training mode or a validation mode. Step 360 is described in further detail with respect to flowchart 700 in FIG. 7.

Figure 4:
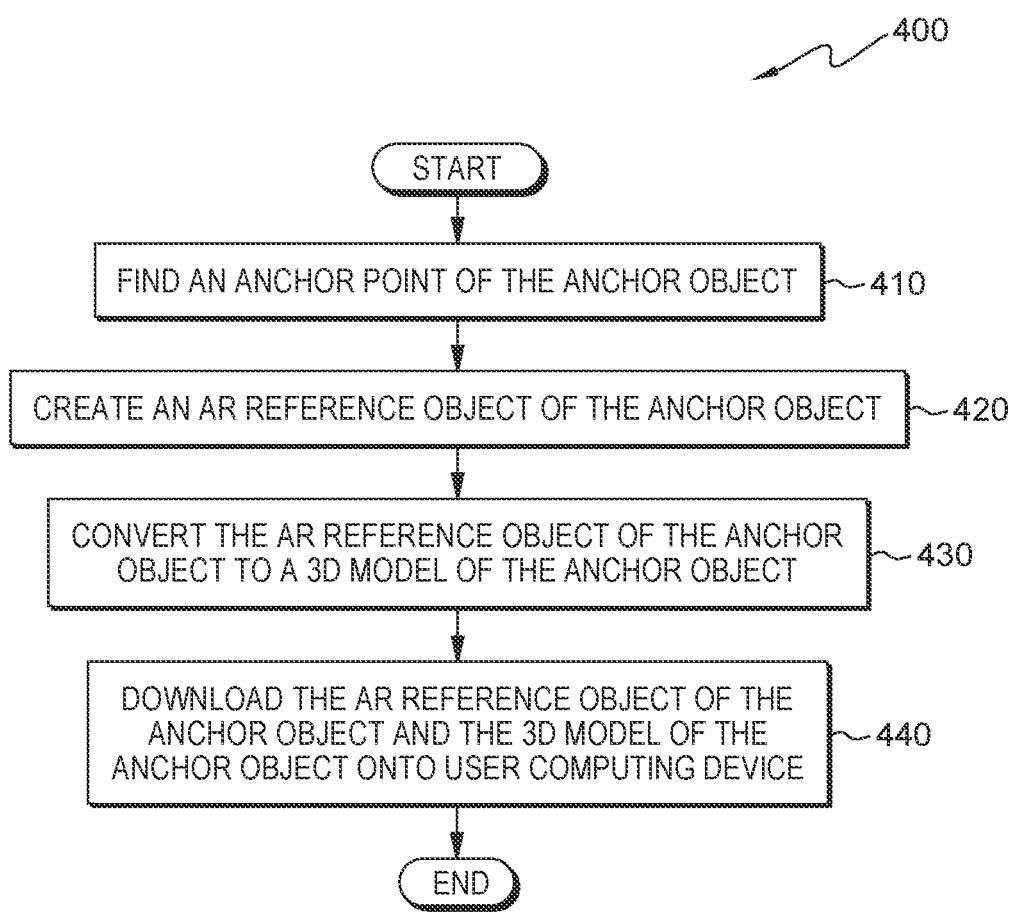
FIG. 4 is a flowchart illustrating the operational steps for a baseline generation component of the synthetic visual inspection data set creation program, on the user computing device within the distributed data processing environment of FIG. 1, in accordance with an embodiment of the present invention.

FIG. 4 is a flowchart, generally designated 400, illustrating the operational steps of baseline generation component 135 of synthetic visual inspection data set creation program 133 on user computing device 130 in distributed data processing environment 100 of FIG. 1, in accordance with an embodiment of the present invention. In an embodiment, baseline generation component 135 of synthetic visual inspection data set creation program 133 operates to create the AR reference object of the anchor object. In an embodiment, baseline generation component 135 of synthetic visual inspection data set creation program 133 operates to convert the AR reference object of the anchor object to create the 3D model of the anchor object. It should be appreciated that the process depicted in FIG. 4 illustrates one possible iteration of baseline generation component 135 of synthetic visual inspection data set creation program 133, which may be repeated for each anchor object defined by baseline generation component 135 of synthetic visual inspection data set creation program 133.

In step 410, baseline generation component 135 of synthetic visual inspection data set creation program 133 finds an anchor point (i.e., the origin) of the anchor object. In an embodiment, baseline generation component 135 of synthetic visual inspection data set creation program 133 adjusts the anchor point relative to the anchor object. In another embodiment, baseline generation component 135 of synthetic visual inspection data set creation program 133 enables the user to adjust the anchor point relative to the anchor object. In an embodiment, baseline generation component 135 of synthetic visual inspection data set creation program 133 displays the anchor point of the anchor object using the x, y, and z coordinate axis lines.

In step 420, baseline generation component 135 of synthetic visual inspection data set creation program 133 creates the AR reference object. In an embodiment, responsive to finding the anchor point of the anchor object, baseline generation component 135 of synthetic visual inspection data set creation program 133 creates the AR reference object. In an embodiment, baseline generation component 135 of synthetic visual inspection data set creation program 133 creates the AR reference object of the anchor object. In an embodiment, baseline generation component 135 of synthetic visual inspection data set creation program 133 creates the AR reference object of the anchor object for use in object detection. The AR reference object of the anchor object is an internal map of the anchor object and the surroundings of the anchor object created from the plurality of images of the anchor object received from the user. In an embodiment, baseline generation component 135 of synthetic visual inspection data set creation program 133 creates the AR reference object of the anchor object using an application.

In an embodiment, baseline generation component 135 of synthetic visual inspection data set creation program 133 reconfigures its session in ARObjectScanningConfiguration to detect the AR reference object of the anchor object.

In an embodiment, baseline generation component 135 of synthetic visual inspection data set creation program 133 stores the AR reference object of the anchor object. In an embodiment, baseline generation component 135 of synthetic visual inspection data set creation program 133 stores the AR reference object of the anchor object as an .arobject file for use in later sessions in a database, e.g., local database 138. In an embodiment, baseline generation component 135 of synthetic visual inspection data set creation program 133 stores the AR reference object of the anchor object as an .arobject file using the export(to:previewlmage:) method. The export(to:previewlmage:) method provides a picture of the real-world object for Xcode to use as a preview image.

In step 430, baseline generation component 135 of synthetic visual inspection data set creation program 133 converts the AR reference object to the 3D model of the anchor object. In an embodiment, responsive to creating the AR reference object, baseline generation component 135 of synthetic visual inspection data set creation program 133 converts the AR reference object to the 3D model of anchor object. In an embodiment, baseline generation component 135 of synthetic visual inspection data set creation program 133 creates the 3D model of the anchor object. In an embodiment, baseline generation component 135 of synthetic visual inspection data set creation program 133 creates the 3D model of the anchor object from the AR reference object in USDZ format. In an embodiment, baseline generation component 135 of synthetic visual inspection data set creation program 133 displays the 3D model of the anchor object for the user on user interface 132 of user computing device 130. In an embodiment, baseline generation component 135 of synthetic visual inspection data set creation program 133 displays the 3D model of the anchor object as the anchor object would appear in AR upon detecting the anchor object in a real-world scenario (i.e., displays a live preview of the anchor object). In an embodiment, baseline generation component 135 of synthetic visual inspection data set creation program 133 enables the user to adjust the size of the 3D model of the anchor object. In an embodiment, baseline generation component 135 of synthetic visual inspection data set creation program 133 stores the 3D model of the anchor object in a database, e.g., local database 138.

In step 440, baseline generation component 135 of synthetic visual inspection data set creation program 133 downloads the AR reference object of the anchor object and the 3D model of the anchor object (i.e., the baseline model of the anchor object) onto user computing device 130. In an embodiment, responsive to converting the AR reference object to the 3D model of the anchor object, baseline generation component 135 of synthetic visual inspection data set creation program 133 downloads the AR reference object of the anchor object and the 3D model of the anchor object onto user computing device 130.

Figure 5:
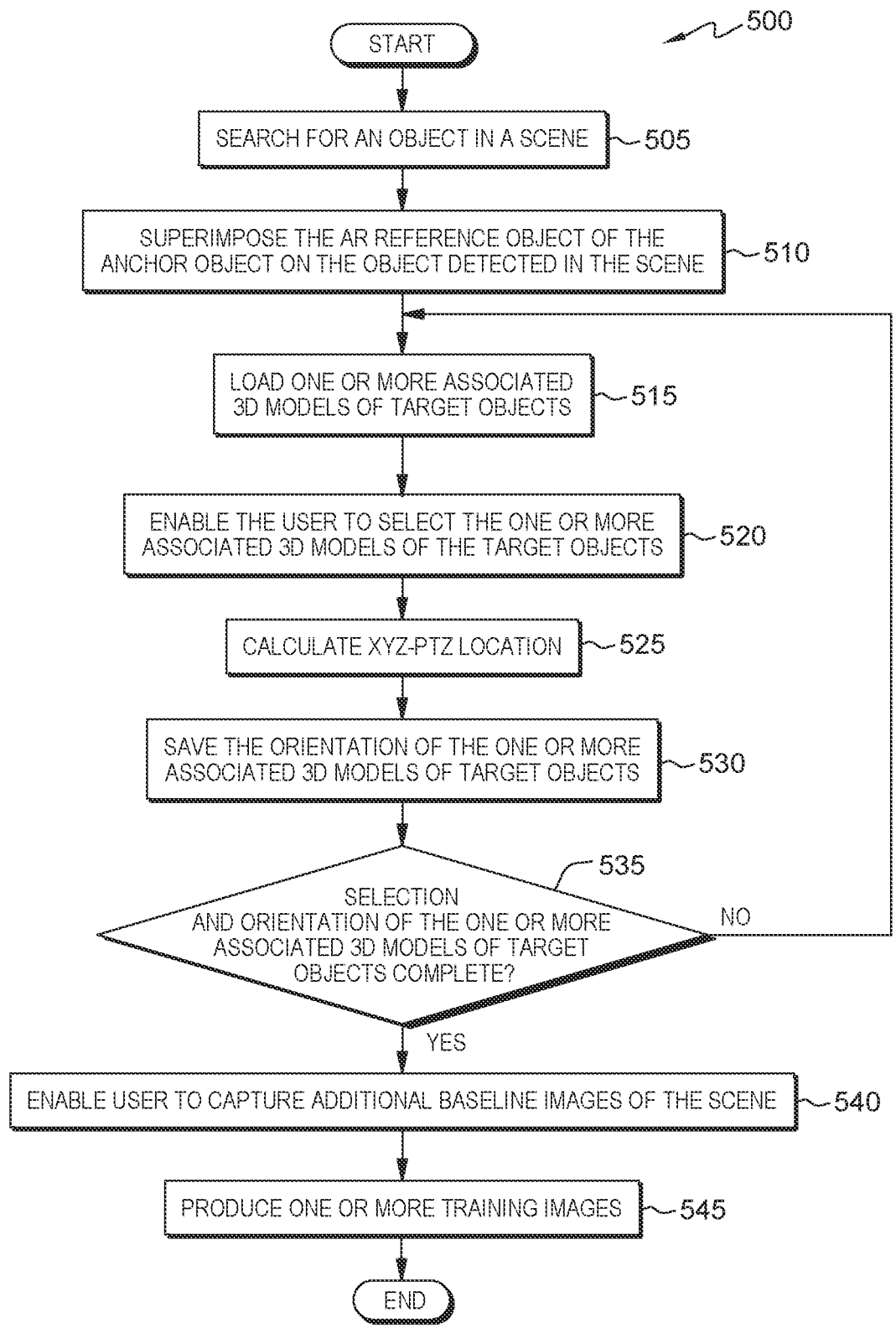
FIG. 5 is a flowchart illustrating the operational steps for an augmented data set generation component of the synthetic visual inspection data set creation program, on the user computing device within the distributed data processing environment of FIG. 1, in accordance with an embodiment of the present invention.

FIG. 5 is a flowchart, generally designated 500, illustrating the operational steps of augmented data set generation component 136 of synthetic visual inspection data set creation program 133 on user computing device 130 in distributed data processing environment 100 of FIG. 1, in accordance with an embodiment of the present invention. In an embodiment, augmented data set generation component 136 of synthetic visual inspection data set creation program 133 operates to enable the user to select one or more associated 3D models of target objects and to orient the one or more associated 3D models of target objects relative to the position of the anchor object using data augmentation. In an embodiment, augmented data set generation component 136 of synthetic visual inspection data set creation program 133 operates to generate a newly created training data set or to update an already existing training data set with one or more training images and the metadata associated with the one or more training images. It should be appreciated that the process depicted in FIG. 5 illustrates one possible iteration of augmented data set generation component 136 of synthetic visual inspection data set creation program 133, which may be repeated for each anchor object found in the scene by augmented data set generation component 136 of synthetic visual inspection data set creation program 133.

In step 505, augmented data set generation component 136 of synthetic visual inspection data set creation program 133 searches for an object in a scene. In an embodiment, augmented data set generation component 136 of synthetic visual inspection data set creation program 133 searches for an object in a scene captured through camera 131 of user computing device 130. In an embodiment, augmented data set generation component 136 of synthetic visual inspection data set creation program 133 detects an object in the scene.

In step 510, augmented data set generation component 136 of synthetic visual inspection data set creation program 133 superimposes the AR reference object of the anchor object on the object detected in the scene. In an embodiment, responsive to searching for the object in the scene, augmented data set generation component 136 of synthetic visual inspection data set creation program 133 superimposes the AR reference object of the anchor object on the object detected in the scene. In an embodiment, augmented data set generation component 136 of synthetic visual inspection data set creation program 133 superimposes the AR reference object of the anchor object on the object detected in the scene to confirm that the object found is the anchor object. In an embodiment, augmented data set generation component 136 of synthetic visual inspection data set creation program 133 superimposes the AR reference object of the anchor object on the object detected in the scene as a visual cue to assist the user in positioning camera 131 of user computing device 130 in the proper direction.

In step 515, augmented data set generation component 136 of synthetic visual inspection data set creation program 133 loads one or more associated 3D models of target objects. In an embodiment, responsive to superimposing the AR reference object of the anchor object on the object detected in the scene, augmented data set generation component 136 of synthetic visual inspection data set creation program 133 loads one or more associated 3D models of target objects. A target object is a smaller object that may or may not be present, or positioned in a consistent manner, in the scene relative to the anchor object. A target object has a known 3D model. In an embodiment, augmented data set generation component 136 of synthetic visual inspection data set creation program 133 loads one or more associated 3D models of target objects provided by the user from a library stored in local database 138.

In step 520, augmented data set generation component 136 of synthetic visual inspection data set creation program 133 enables the user to select the one or more associated 3D models of the target objects. In an embodiment, responsive to loading the one or more associated 3D models of the target objects, augmented data set generation component 136 of synthetic visual inspection data set creation program 133 enables the user to select the one or more associated 3D models of the target objects. In an embodiment, augmented data set generation component 136 of synthetic visual inspection data set creation program 133 enables the user to select the one or more associated 3D models of the target objects on user interface 132 of user computing device 130.

In an embodiment, augmented data set generation component 136 of synthetic visual inspection data set creation program 133 enables the user to orient the one or more associated 3D models of the target objects selected. In an embodiment, augmented data set generation component 136 of synthetic visual inspection data set creation program 133 enables the user to orient the one or more associated 3D models of the target objects selected relative to the position of the anchor object. In an embodiment, augmented data set generation component 136 of synthetic visual inspection data set creation program 133 enables the user to orient the one or more associated 3D models of the target objects selected using data augmentation. Data augmentation, in computer vision, is manipulating (e.g., moving, rotating, removing, and re-texturing) an image of a known labeled dataset to increase the size of the dataset for better model training. In an embodiment, augmented data set generation component 136 of synthetic visual inspection data set creation program 133 enables the user to orient the one or more associated 3D models of the target objects selected through user interface 132 of user computing device 130.

In an embodiment, augmented data set generation component 136 of synthetic visual inspection data set creation program 133 enables the user to pause the selection and orientation features in order to use multiple hands to interact with user computing device 130. In an embodiment, augmented data set generation component 136 of synthetic visual inspection data set creation program 133 enables the user to restart the selection and orientation features.

In an embodiment, augmented data set generation component 136 of synthetic visual inspection data set creation program 133 stores the one or more associated 3D models of the target objects selected and orientated in a database, e.g., local database 138.

In step 525, augmented data set generation component 136 of synthetic visual inspection data set creation program 133 calculates a xyz-ptz location. In an embodiment, responsive to enabling the user to select the one or more associated 3D models of the target objects, augmented data set generation component 136 of synthetic visual inspection data set creation program 133 calculates the xyz-ptz location. In an embodiment, augmented data set generation component 136 of synthetic visual inspection data set creation program 133 calculates a xyz-ptz location of the one or more associated 3D models of the target objects selected (i.e., in step 520) relative to the position of the anchor object. The xyz-ptz location describes the location and orientation of the one or more associated 3D models of the target objects in a scene relative to the position of the anchor object. In an embodiment, augmented data set generation component 136 of synthetic visual inspection data set creation program 133 stores the xyz-ptz location of the one or more associated 3D models of the target objects selected in a database, e.g., local database 138.

In step 530, augmented data set generation component 136 of synthetic visual inspection data set creation program 133 saves the orientation of the one or more associated 3D models of the target objects. In an embodiment, responsive to calculating the xyz-ptz location, augmented data set generation component 136 of synthetic visual inspection data set creation program 133 saves the orientation of the one or more associated 3D models of the target objects. In an embodiment, augmented data set generation component 136 of synthetic visual inspection data set creation program 133 saves the orientation of the one or more associated 3D models of the target objects to a database, e.g., local database 138.

In decision 535, augmented data set generation component 136 of synthetic visual inspection data set creation program 133 determines whether the selection and orientation of the one or more associated 3D models of the target objects is complete. In an embodiment, responsive to saving the orientation of the one or more associated 3D models of the target objects, augmented data set generation component 136 of synthetic visual inspection data set creation program 133 determines whether the selection and orientation of the one or more associated 3D models of the target objects is complete. In an embodiment, augmented data set generation component 136 of synthetic visual inspection data set creation program 133 determines whether the selection and orientation of the one or more associated 3D models of the target objects is complete based on a pre-set threshold. In another embodiment, augmented data set generation component 136 of synthetic visual inspection data set creation program 133 determines whether the selection and orientation of the one or more associated 3D models of the target objects is complete by enabling the user to mark the selection and orientation process as complete.

If augmented data set generation component 136 of synthetic visual inspection data set creation program 133 determines the selection and orientation of the one or more associated 3D models of the target objects is complete (decision 535, YES branch), then augmented data set generation component 136 of synthetic visual inspection data set creation program 133 enables the user to capture one or more additional baseline images of the scene (step 540). If augmented data set generation component 136 of synthetic visual inspection data set creation program 133 determines the selection and orientation of the one or more associated 3D models of the target objects is not complete (decision 535, NO branch), then augmented data set generation component 136 of synthetic visual inspection data set creation program 133 loads additional 3D models of the target objects from the library stored in local database 138 (step 515).

In step 540, augmented data set generation component 136 of synthetic visual inspection data set creation program 133 enables the user to capture one or more additional baseline images of the scene. In an embodiment, responsive to determining the selection and orientation of the one or more associated 3D models of the target objects is complete, augmented data set generation component 136 of synthetic visual inspection data set creation program 133 enables the user to capture one or more additional baseline images of the scene. In an embodiment, augmented data set generation component 136 of synthetic visual inspection data set creation program 133 enables the user to capture one or more additional baseline images of the scene using camera 131 on user computing device 130.

For example, augmented data set generation component 136 of synthetic visual inspection data set creation program 133 enables the user to capture one or more additional baseline images of the scene after repositioning camera 131 on user computing device 130 which is set up on a tripod. In another example, augmented data set generation component 136 of synthetic visual inspection data set creation program 133 enables the user to capture one or more additional baseline images of the scene from a different angle. In yet another example, augmented data set generation component 136 of synthetic visual inspection data set creation program 133 enables the user to capture one or more additional baseline images of the scene after adjusting the one or more types of lighting of the scene.

In step 545, augmented data set generation component 136 of synthetic visual inspection data set creation program 133 produces one or more training images. In an embodiment, responsive to enabling the user to capture one or more additional baseline images of the scene, augmented data set generation component 136 of synthetic visual inspection data set creation program 133 produces one or more training images. In an embodiment, augmented data set generation component 136 of synthetic visual inspection data set creation program 133 produces one or more training images of the one or more additional baseline images of the scene. In an embodiment, augmented data set generation component 136 of synthetic visual inspection data set creation program 133 produces one or more training images of the anchor object. In an embodiment, augmented data set generation component 136 of synthetic visual inspection data set creation program 133 produces one or more training images of the target objects selected.

In an embodiment, augmented data set generation component 136 of synthetic visual inspection data set creation program 133 uploads the one or more training images and the metadata associated with the one or more training images to a newly created training data set. In another embodiment, augmented data set generation component 136 of synthetic visual inspection data set creation program 133 uploads the one or more training images and the metadata associated with the one or more training images to an already existing training data set. The training data set is a collection of images that are labeled for training a model. In an embodiment, augmented data set generation component 136 of synthetic visual inspection data set creation program 133 stores the training data set in a database, e.g., local database 138.

Figure 6:
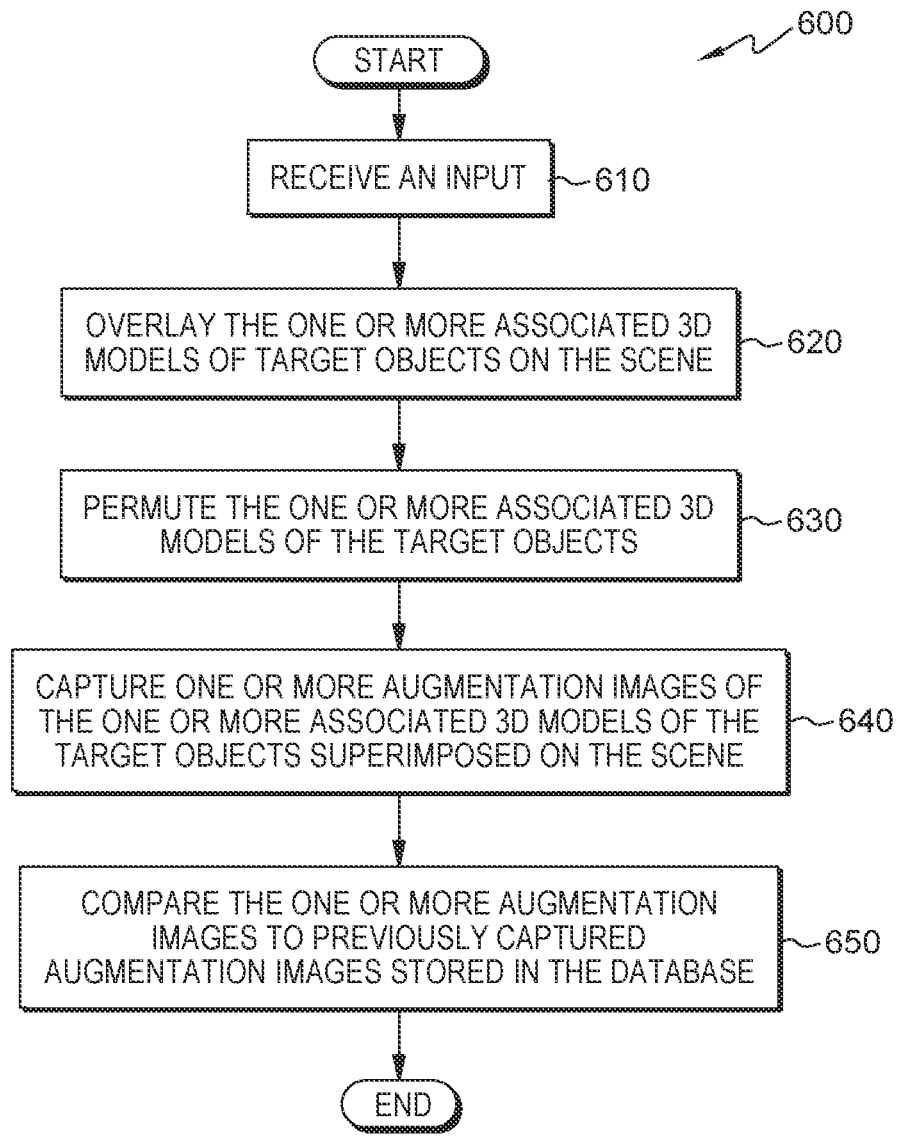
FIG. 6 is a flowchart illustrating the training steps for a training and validation component of the synthetic visual inspection data set creation program, on the user computing device within the distributed data processing environment of FIG. 1, in accordance with an embodiment of the present invention.

FIG. 6 is a flowchart, generally designated 600, illustrating the training steps of training and validation component 137 of synthetic visual inspection data set creation program 133 on user computing device 130 in distributed data processing environment 100 of FIG. 1, in accordance with an embodiment of the present invention. In an embodiment, training and validation component 137 of synthetic visual inspection data set creation program 133 operates to randomly permute (e.g., moves, removes, rotates, or re-textures) the one or more associated 3D models of the target objects. In an embodiment, training and validation component 137 of synthetic visual inspection data set creation program 133 operates to capture one or more augmentation images of the one or more associated 3D models of the target objects superimposed on the scene as the one or more associated 3D models of the target objects are randomly permuted. In an embodiment, training and validation component 137 of synthetic visual inspection data set creation program 133 operates to compare the one or more augmentation images to previously captured augmentation images to understand the performance of the augmentation. In an embodiment, synthetic visual inspection data set creation program 133 operates to update the baseline model of the anchor object utilizing the captured images, tuning parameters, and augmentation algorithms. In an embodiment, synthetic visual inspection data set creation program 133 operates to train the baseline model of the anchor object to create a trained AI computer vision deep learning model that can identify the anchor object in a 3D representation. It should be appreciated that the process depicted in FIG. 6 illustrates one possible iteration of training and validation component 137 of synthetic visual inspection data set creation program 133, which may be repeated for each input received by training and validation component 137 of synthetic visual inspection data set creation program 133.

In step 610, training and validation component 137 of synthetic visual inspection data set creation program 133 receives an input. In an embodiment, training and validation component 137 of synthetic visual inspection data set creation program 133 receives an input from augmented data set generation component 136 of synthetic visual inspection data set creation program 133. The input includes, but is not limited to, one or more training images of the one or more baseline images of the scene, one or more training images of the anchor object, one or more training images of the target objects selected, the training data set created in step 550, data on the orientation of the one or more associated 3D models of the target objects relative to the position of the anchor object, and user-inputted parameters. User-inputted parameters include, but are not limited to, the variations of positions and the pre-determined target number of augmentation images to be generated.

In step 620, training and validation component 137 of synthetic visual inspection data set creation program 133 overlays the one or more associated 3D models of the target objects on the scene. In an embodiment, responsive to receiving an input, training and validation component 137 of synthetic visual inspection data set creation program 133 overlays the one or more associated 3D models of the target objects on the scene.

In step 630, training and validation component 137 of synthetic visual inspection data set creation program 133 randomly permutes (e.g., moves, removes, rotates, or re-textures) the one or more associated 3D models of the target objects. In an embodiment, responsive to overlaying the one or more associated 3D models of the target objects on the scene, training and validation component 137 of synthetic visual inspection data set creation program 133 randomly permutes the one or more associated 3D models of the target objects. In an embodiment, training and validation component 137 of synthetic visual inspection data set creation program 133 randomly permutes the one or more associated 3D models of the target objects on the scene based on one or more function inputs received from the user in step 610. In an embodiment, training and validation component 137 of synthetic visual inspection data set creation program 133 randomly permutes the one or more associated 3D models of the target objects to train the one or more associated 3D models of the target objects for one or more situations that may occur. For example, training and validation component 137 of synthetic visual inspection data set creation program 133 randomly changes a "good" capacitor to a "burnt" capacitor. In another example, training and validation component 137 of synthetic visual inspection data set creation program 133 partially disconnects a plug. In yet another example, training and validation component 137 of synthetic visual inspection data set creation program 133 randomly permutes the one or more associated 3D models of the target objects to create a situation where a connector is fully-seated (0 millimeters out of place) and a situation where the connector is fully-disconnected (10 millimeters out of place).

In an embodiment, training and validation component 137 of synthetic visual inspection data set creation program 133 enables the user to resize the one or more associated 3D models of the target objects. In an embodiment, training and validation component 137 of synthetic visual inspection data set creation program 133 enables the user to rotate the one or more associated 3D models of the target objects. In an embodiment, training and validation component 137 of synthetic visual inspection data set creation program 133 enables the user to adjust the one or more types of lighting illuminating the one or more associated 3D models of the target objects.

In step 640, training and validation component 137 of synthetic visual inspection data set creation program 133 captures one or more augmentation images of the one or more associated 3D models of the target objects superimposed on the scene. In an embodiment, responsive to randomly permuting the one or more associated 3D models of the target objects, training and validation component 137 of synthetic visual inspection data set creation program 133 captures one or more augmentation images of the one or more associated 3D models of the target objects superimposed on the scene. In an embodiment, training and validation component 137 of synthetic visual inspection data set creation program 133 captures one or more augmentation images of the one or more associated 3D models of the target objects superimposed on the scene as the one or more associated 3D models of the target objects are randomly permuted. In an embodiment, training and validation component 137 of synthetic visual inspection data set creation program 133 captures one or more augmentation images of the one or more associated 3D models of the target objects superimposed on the scene as the user resizes, rotates, or adjusts the one or more types of lighting illuminating the one or more associated 3D models of the target objects.

In step 650, training and validation component 137 of synthetic visual inspection data set creation program 133 compares the one or more augmentation images to previously captured augmentation images stored in the database, e.g., local database 138. In an embodiment, responsive to randomly permuting the one or more augmentation images of the one or more associated 3D models of the target objects superimposed on the scene, training and validation component 137 of synthetic visual inspection data set creation program 133 compares the one or more augmentation images to previously captured augmentation images stored in the database. In an embodiment, training and validation component 137 of synthetic visual inspection data set creation program 133 compares the one or more augmentation images to previously captured augmentation images to understand the performance of the augmentation.

Figure 7:
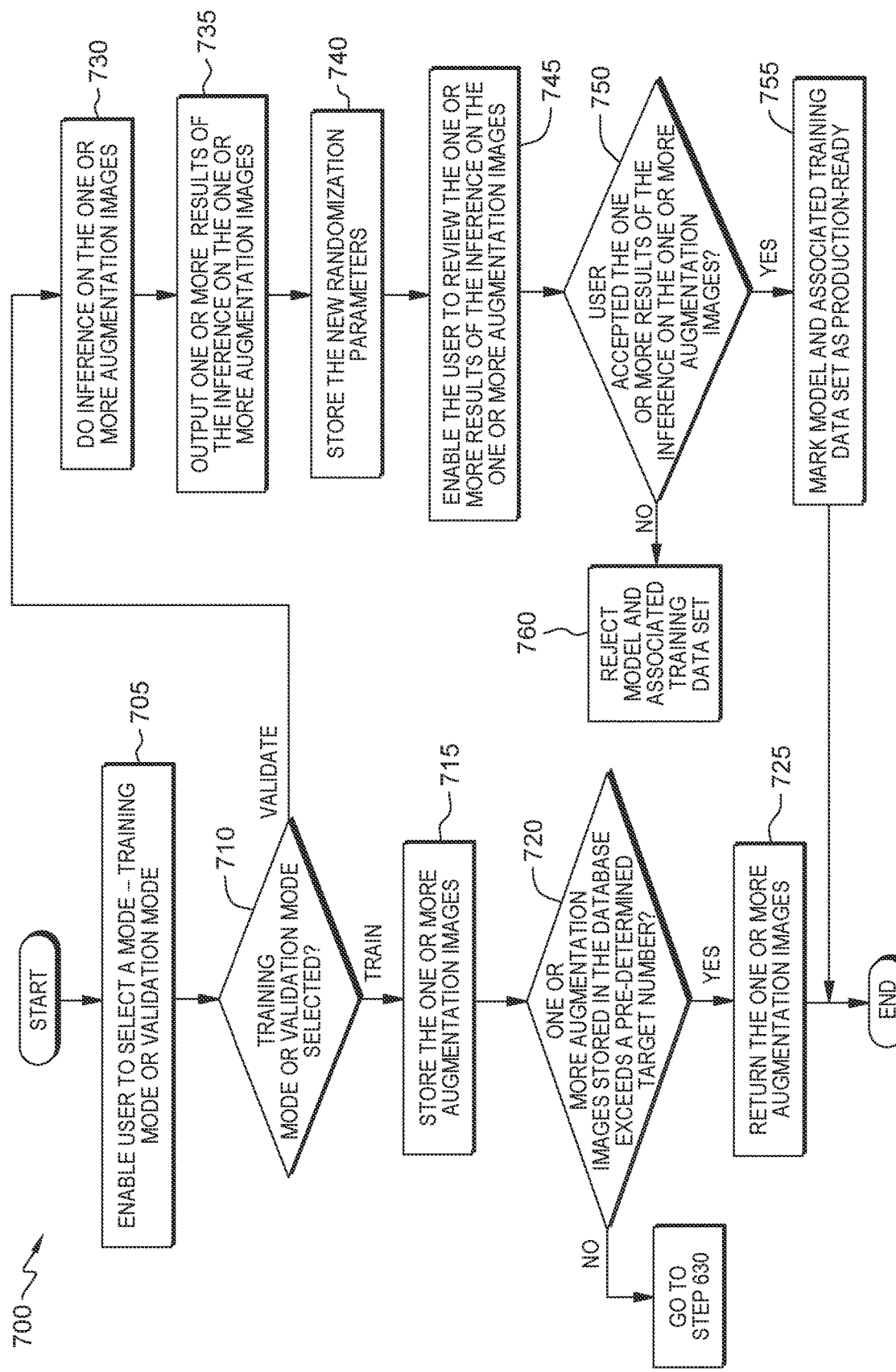
FIG. 7 is a flowchart illustrating the validation steps for the training and validation component of the synthetic visual inspection data set creation program, on the user computing device within the distributed data processing environment of FIG. 1, in accordance with an embodiment of the present invention.

FIG. 7 is a flowchart, generally designated 700, illustrating the validation steps of training and validation component 137 of synthetic visual inspection data set creation program 133 on user computing device 130 in distributed data processing environment 100 of FIG. 1, in accordance with an embodiment of the present invention. In an embodiment, training and validation component 137 of synthetic visual inspection data set creation program 133 operates to enable the user to interact with the trained AI computer vision deep learning model in an access mode by superimposing the one or more associated 3D models of the target objects on the anchor object. It should be appreciated that the process depicted in FIG. 7 illustrates one possible iteration of training and validation component 137 of synthetic visual inspection data set creation program 133, which may be repeated for each input received by training and validation component 137 of synthetic visual inspection data set creation program 133.

In step 705, training and validation component 137 of synthetic visual inspection data set creation program 133 enables the user to select a mode, i.e., a "training mode" or a "validation mode." In an embodiment, training and validation component 137 of synthetic visual inspection data set creation program 133 enables the user to select a mode using user interface 132 of user computing device 130. In an embodiment, training and validation component 137 of synthetic visual inspection data set creation program 133 receives a response. In an embodiment, training and validation component 137 of synthetic visual inspection data set creation program 133 receives a response inputted by the user into user interface 132 of user computing device 130. In an embodiment, training and validation component 137 of synthetic visual inspection data set creation program 133 receives a response regarding the mode selected.

In decision 710, training and validation component 137 of synthetic visual inspection data set creation program 133 determines whether the user selected the training mode or the validation mode. In an embodiment, responsive to enabling the user to select a mode, training and validation component 137 of synthetic visual inspection data set creation program 133 determines whether the user selected the training mode or the validation mode. In an embodiment, training and validation component 137 of synthetic visual inspection data set creation program 133 determines whether the user selected the training mode or the validation mode from the response inputted by the user into user interface 132 of user computing device 130.

If training and validation component 137 of synthetic visual inspection data set creation program 133 determines the user selected the training mode (decision 710, TRAIN branch), then training and validation component 137 of synthetic visual inspection data set creation program 133 stores the one or more augmentation images (step 715). If training and validation component 137 of synthetic visual inspection data set creation program 133 determines the user selected the validation mode (decision 710, VALIDATE branch), then training and validation component 137 of synthetic visual inspection data set creation program 133 does an inference on the one or more augmentation images (step 730).

In step 715, training and validation component 137 of synthetic visual inspection data set creation program 133 stores the one or more augmentation images. In an embodiment, responsive to determining the user selected the training mode, training and validation component 137 of synthetic visual inspection data set creation program 133 stores the one or more augmentation images. In an embodiment, training and validation component 137 of synthetic visual inspection data set creation program 133 stores the one or more augmentation images in a database, e.g., local database 138 or database 124.

In decision 720, training and validation component 137 of synthetic visual inspection data set creation program 133 determines whether the one or more augmentation images stored in the database exceeds a pre-determined target number. In an embodiment, responsive to storing the one or more augmentation images, training and validation component 137 of synthetic visual inspection data set creation program 133 determines whether the one or more augmentation images stored in the database exceeds a pre-determined target number. The target number is a predetermined number of associated 3D models of target objects.

If training and validation component 137 of synthetic visual inspection data set creation program 133 determines the one or more augmentation images stored in the database exceeds a pre-determined target number (decision 720, YES branch), then training and validation component 137 of synthetic visual inspection data set creation program 133 returns the one or more augmentation images (step 725). If training and validation component 137 of synthetic visual inspection data set creation program 133 determines the one or more augmentation images stored in the database does not exceed a pre-determined target number (decision 720, NO branch), then training and validation component 137 of synthetic visual inspection data set creation program 133 continues to randomly permute the one or more associated 3D models of the target objects and to generate one or more augmentation images (step 630).

In step 725, training and validation component 137 of synthetic visual inspection data set creation program 133 returns the one or more augmentation images. In an embodiment, responsive to determining the one or more augmentation images stored in the database exceeds the pre-determined target number, training and validation component 137 of synthetic visual inspection data set creation program 133 return the one or more augmentation images. In an embodiment, training and validation component 137 of synthetic visual inspection data set creation program 133 returns the one or more augmentation images to the calling function of augmented data set generation component 136 of synthetic visual inspection data set creation program 133 (step 545).

In step 730, training and validation component 137 of synthetic visual inspection data set creation program 133 does an inference on the one or more augmentation images. In an embodiment, responsive to determining the user selected the validation mode, training and validation component 137 of synthetic visual inspection data set creation program 133 does an inference on the one or more augmentation images. An inference is using a trained AI computer vision deep learning model to examine the one or more augmentation images and to find the contents or a description of the one or more augmentation images. For example, training and validation component 137 of synthetic visual inspection data set creation program 133 does an inference on the one or more augmentation images to locate connectors, bolts, and other objects of interest.

In step 735, training and validation component 137 of synthetic visual inspection data set creation program 133 outputs one or more results of the inference on the one or more augmentation images. In an embodiment, responsive to doing an inference on the one or more augmentation images, training and validation component 137 of synthetic visual inspection data set creation program 133 outputs one or more results of the inference on the one or more augmentation images. In an embodiment, training and validation component 137 of synthetic visual inspection data set creation program 133 outputs the one or more results of the inference on the one or more augmentation images to the user through user interface 132 of user computing device 130.

In step 740, training and validation component 137 of synthetic visual inspection data set creation program 133 stores the new randomization parameters. In an embodiment, responsive to outputting the one or more results of the inference on the one or more augmentation images, training and validation component 137 of synthetic visual inspection data set creation program 133 stores the new randomization parameters. In an embodiment, training and validation component 137 of synthetic visual inspection data set creation program 133 stores the new randomization parameters in a database, e.g., local database 138 or database 124.

In step 745, training and validation component 137 of synthetic visual inspection data set creation program 133 enables the user to review the one or more results of the inference on the one or more augmentation images (i.e., the trained AI computer vision deep learning model and the associated training data set). In an embodiment, responsive to storing the new randomization parameters, training and validation component 137 of synthetic visual inspection data set creation program 133 enables the user to review the one or more results of the inference on the one or more augmentation images. In an embodiment, training and validation component 137 of synthetic visual inspection data set creation program 133 enables the user to accept or to reject the one or more results of the inference on the one or more augmentation images. In an embodiment, training and validation component 137 of synthetic visual inspection data set creation program 133 enables the user to accept or to reject the one or more results of the inference on the one or more augmentation images through user interface 132 of user computing device 130.

In decision 750, training and validation component 137 of synthetic visual inspection data set creation program 133 determines whether the user accepted the one or more results of the inference on the one or more augmentation images. In an embodiment, responsive to enabling the user to review the one or more results of the inference on the one or more augmentation images, training and validation component 137 of synthetic visual inspection data set creation program 133 determines whether the user accepted the one or more results of the inference on the one or more augmentation images. In an embodiment, training and validation component 137 of synthetic visual inspection data set creation program 133 determines whether the user accepted the one or more results of the inference on the one or more augmentation images by summarizing the validation results, allowing the user to explore the individual inferences, and then prompting the user to accept or reject the one or more results of the inference on the one or more augmentation images.

If training and validation component 137 of synthetic visual inspection data set creation program 133 determines the user accepted the one or more results of the inference on the one or more augmentation images (decision 750, YES branch), then training and validation component 137 of synthetic visual inspection data set creation program 133 marks the AI computer vision deep learning model and the associated training data set as production-ready (step 755). If training and validation component 137 of synthetic visual inspection data set creation program 133 determines the user rejected the one or more results of the inference on the one or more augmentation images (decision 750, NO branch), then training and validation component 137 of synthetic visual inspection data set creation program 133 rejects the AI computer vision deep learning model and the associated training data set (step 760).

In step 755, training and validation component 137 of synthetic visual inspection data set creation program 133 marks the AI computer vision deep learning model and the associated training data set as production-ready. In an embodiment, responsive to determining the user accepted the one or more results of the inference on the one or more augmentation images, training and validation component 137 of synthetic visual inspection data set creation program 133 marks the AI computer vision deep learning model and the associated training data set as production-ready. Production-ready means that the AI computer vision deep learning model and the associated training data set are ready for deployment and use in the field.

In step 760, training and validation component 137 of synthetic visual inspection data set creation program 133 rejects the AI computer vision deep learning model and the associated training data set. In an embodiment, responsive to determining the user did not accept the one or more results of the inference on the one or more augmentation images, training and validation component 137 of synthetic visual inspection data set creation program 133 rejects the AI computer vision deep learning model and the associated training data set. Rejected means that the user viewed the validation results or metrics and decided the model is not "adequate" and is not production-ready. In an embodiment, training and validation component 137 of synthetic visual inspection data set creation program 133 returns to step 505 to create another training data set.

Figure 8:
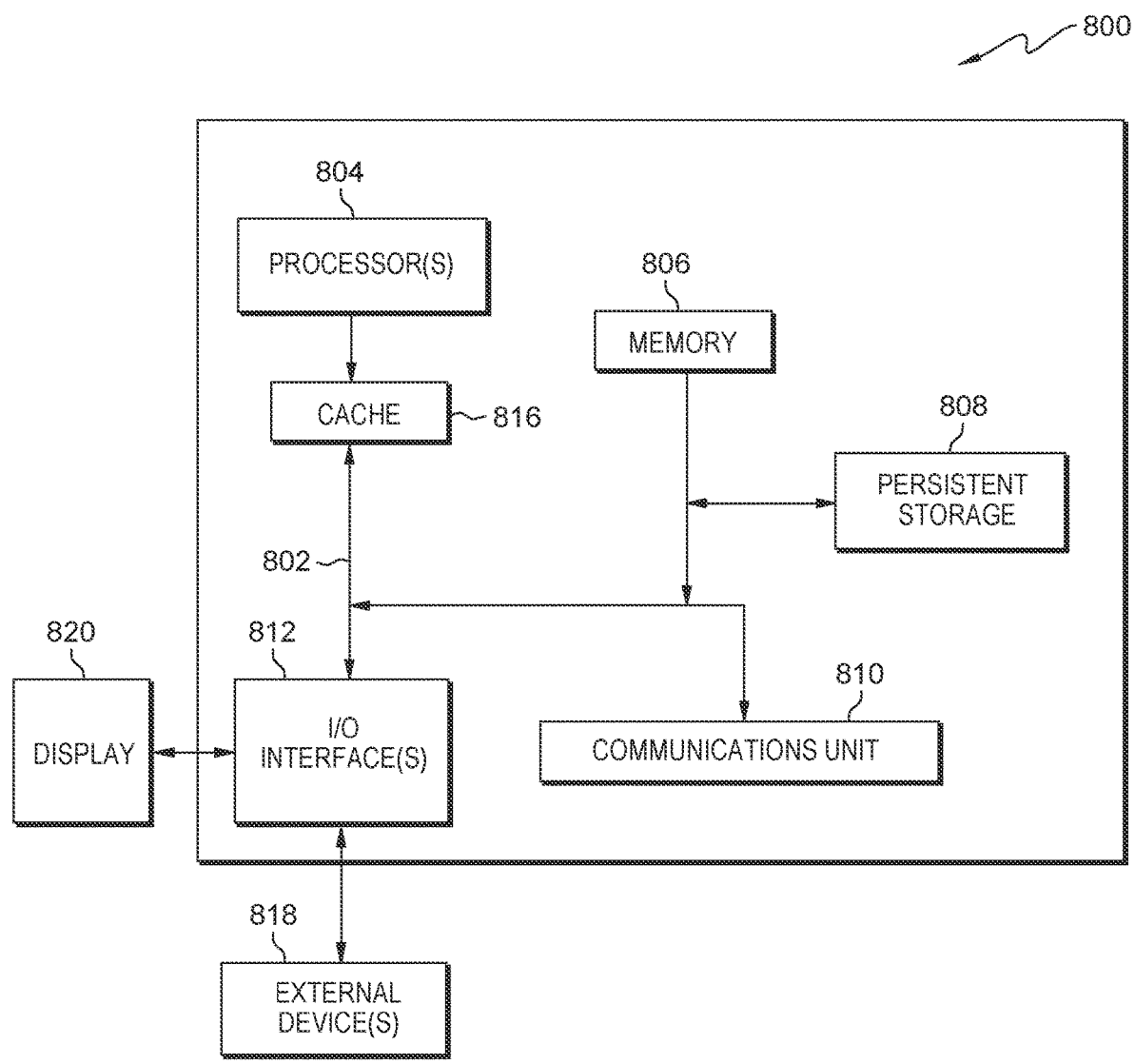
FIG. 8 is a block diagram illustrating the components of a computing device in the distributed data processing environment of FIG. 1, in accordance with an embodiment of the present invention.

FIG. 8 is a block diagram illustrating the components of computer system 800, suitable for server 120 and/or user computing device 130 within distributed data processing environment 100 of FIG. 1, in accordance with an embodiment of the present invention. It should be appreciated that FIG. 8 provides only an illustration of one implementation and does not imply any limitations with regard to the environments in which different embodiments can be implemented. Many modifications to the depicted environment can be made.

Computer system 800 includes processor(s) 804, memory 806, cache 816, communications fabric 802, persistent storage 808, input/output (I/O) interface(s) 812, and communications unit 810.

Communications fabric 802 provides communications between memory 806, cache 816, persistent storage 808, input/output (I/O) interface(s) 812, and communications unit 810. Communications fabric 802 can be implemented with any architecture designed for passing data and/or control information between processors (such as microprocessors, communications and network processors, etc.), system memory, peripheral devices, and any other hardware components within a system. For example, communications fabric 802 can be implemented with one or more buses or a cross switch.

Memory 806 and persistent storage 808 are computer readable storage media. In this embodiment, memory 806 includes random access memory (RAM). In general, memory 806 can include any suitable volatile or non-volatile computer readable storage media. Cache 816 is a fast memory that enhances the performance of computer processor(s) 804 by holding recently accessed data, and data near accessed data, from memory 806.

Program instructions and data (e.g., software and data 814) used to practice embodiments of the present invention may be stored in persistent storage 808 and in memory 806 for execution by one or more of the respective processor(s) 804 via cache 816. In an embodiment, persistent storage 808 includes a magnetic hard disk drive. Alternatively, or in addition to a magnetic hard disk drive, persistent storage 808 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 808 may also be removable. For example, a removable hard drive may be used for persistent storage 808. Other examples include optical and magnetic disks, thumb drives, and smart cards that are inserted into a drive for transfer onto another computer readable storage medium that is also part of persistent storage 808. Software and data 814 can be stored in persistent storage 808 for access and/or execution by one or more of the respective processor(s) 804 via cache 816. With respect to user computing device 130, software and data 814 includes user interface 132. With respect to server 120, software and data 814 includes synthetic visual inspection data set creation program 133.

Communications unit 810, in these examples, provides for communications with other data processing systems or devices. In these examples, communications unit 810 includes one or more network interface cards. Communications unit 810 may provide communications through the use of either or both physical and wireless communications links. Program instructions and data (e.g., software and data 814) used to practice embodiments of the present invention may be downloaded to persistent storage 808 through communications unit 810.

I/O interface(s) 812 allows for input and output of data with other devices that may be connected to server 120 and/or user computing device 130. For example, I/O interface(s) 812 may provide a connection to external device(s) 818, such as a keyboard, a keypad, a touch screen, and/or some other suitable input device. External device(s) 818 can also include portable computer readable storage media, such as, for example, thumb drives, portable optical or magnetic disks, and memory cards. Program instructions and data (e.g., software and data 814) used to practice embodiments of the present invention can be stored on such portable computer readable storage media and can be loaded onto persistent storage 808 via I/O interface(s) 812. I/O interface(s) 812 also connect to display 820.

Display 820 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

While particular embodiments of the present invention have been shown and described here, it will be understood to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understand, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "at least one" or "one or more" and indefinite articles such as "a" or "an", the same holds true for the use in the claims of definite articles.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart illustrations and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart illustrations and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart illustrations and/or block diagram block or blocks.

The flowchart illustrations and block diagrams in the Figures illustrate the architecture, functionality, and operation of possible implementations of systems, methods, and computer program products according to various embodiments of the present invention. In this regard, each block in the flowchart illustrations or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each flowchart illustration and/or block of the block diagrams, and combinations of flowchart illustration and/or blocks in the block diagrams, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   receiving, by one or more processors, a plurality of images of an anchor object from a user, wherein the anchor object is a known fixed reference object comprised of a plurality of sub-objects;
   creating, by the one or more processors, an Artificial Intelligence (AI) computer vision deep learning model;
   training, by the one or more processors, the AI computer vision deep learning model using a synthetic visual inspection data set to identify the anchor object in a three-dimensional representation;
   and
   enabling, by the one or more processors, the user to interact with the trained AI computer vision deep learning model in an access mode, wherein the access mode is one of a training mode and a validation mode by superimposing one or more target objects on the anchor object and capturing one or more images of the one or more target objects superimposed on the anchor object.

2. The computer-implemented method of claim 1, further comprises:
subsequent to receiving the plurality of images of the anchor object from the user, generating, by the one or more processors, a baseline model of the anchor object, wherein generating the baseline model of the anchor object further comprises:
finding, by the one or more processors, an anchor point of the anchor object;
creating, by the one or more processors, an Augmented Reality (AR) Reference Object of the anchor object;
converting, by the one or more processors, the AR Reference Object of the anchor object into a three-dimensional (3D) model of the anchor object in USDZ format; and
downloading, by the one or more processors, the AR Reference Object of the anchor object and the 3D model of the anchor object onto the user computing device.

3. The computer-implemented method of claim 2, wherein converting the AR Reference Object of the anchor object into the 3D model of the anchor object in USDZ format further comprises:
displaying, by the one or more processors, the 3D model of the anchor object for the user on a user interface of the user computing device as the anchor object would appear in AR upon detecting the anchor object in a real-world scenario; and
enabling, by the one or more processors, the user to adjust a size of the 3D model of the anchor object.

4. The computer-implemented method of claim 2 further comprises:
subsequent to generating the baseline model of the anchor object, generating, by the one or more processors, a training data set, wherein generating the training data set further comprises:
searching, by the one or more processors, for an object in a scene using the camera on the user computing device;
detecting, by the one or more processors, the object in the scene;
superimposing, by the one or more processors, the AR Reference Object of the anchor object detected in the scene to confirm that the object found in the scene is the anchor object;
loading, by the one or more processors, one or more associated 3D models of target objects from a database;
enabling, by the one or more processors, the user to select the one or more associated 3D models of the target objects on the user interface of the user computing device;
enabling, by the one or more processors, the user to orient the one or more associated 3D models of the target objects selected relative to the anchor object using data augmentation through the user interface of the user computing device;
calculating, by the one or more processors, a xyz-ptz location of the one or more associated 3D models of the target objects selected relative to the anchor object;
saving, by the one or more processors, an orientation of the one or more associated 3D models of the target objects in the database;
determining, by the one or more processors, the selection and the orientation of the one or more associated 3D models of the target objects is complete;
enabling, by the one or more processors, the user to capture one or more additional baseline images of the scene using the camera on the user computing device;
producing, by the one or more processors, one or more training images of the one or more baseline images of the scene;
producing, by the one or more processors, one or more training images of the anchor object;
producing, by the one or more processors, one or more training images of the target objects selected; and
uploading, by the one or more processors, to a training dataset the one or more training images of the one or more baseline images produced of the scene and metadata associated with the one or more training images of the one or more baseline images produced of the scene; the one or more training images of the anchor object and metadata associated with the one or more training images of the anchor object; the one or more training images of the target objects and metadata associated with the one or more training images of the target objects; the xyz-ptz location of the one or more associated 3D models of the target objects relative to the anchor object; the orientation of the one or more associated 3D models of the target objects; and one or more user-inputted parameters.

5. The computer-implemented method of claim 4, wherein the data augmentation includes moving, rotating, removing, and re-texturing the one or more associated 3D models of the target objects relative to the anchor object to increase the size of the training dataset.

6. The computer-implemented method of claim 4, wherein the input includes the one or more training images of the one or more baseline images of the scene, the one or more training images of the anchor object, the one or more training images of the target objects selected, the training data set created, data on a position of the one or more associated 3D models of the target objects relative to the anchor object, and user-inputted parameters.

7. The computer-implemented method of claim 1, wherein training the AI computer vision deep learning model using a synthetic visual inspection data set to identify the anchor object in the three-dimensional representation further comprises:
receiving, by the one or more processors, an input;
overlaying, by the one or more processors, the one or more associated 3D models of the target objects on the scene;
permuting, by the one or more processors, the one or more associated 3D models of the target objects randomly based on one or more function inputs received from the user;
enabling, by the one or more processors, the user to resize the one or more associated 3D models of the target objects;
enabling, by the one or more processors, the user to rotate the one or more associated 3D models of the target objects;
enabling, by the one or more processors, the user to adjust one or more types of lighting illuminating the one or more associated 3D models of the target objects;

capturing, by the one or more processors, one or more augmentation images of the one or more associated 3D models of the target objects superimposed on the scene; and comparing, by the one or more processors, the one or more augmentation images to previously captured augmentation images stored in the database.

8. The computer-implemented method of claim 7, wherein enabling the user to interact with the trained AI computer vision deep learning model in the access mode further comprises:

enabling, by the one or more processors, the user to select the training mode or the validation mode using the user interface on the user computing device;

receiving, by the one or more processors, a response regarding the mode selected by the user;

determining, by the one or more processors, whether the user selected the validation mode from the response received;

completing, by the one or more processors, an inference on the one or more augmentation images;

outputting, by the one or more processors, one or more results of the inference on the one or more augmentation images to the user through the user interface of the user computing device;

enabling, by the one or more processors, the user to review the one or more results of the inference on the one or more augmentation images;

enabling, by the one or more processors, the user to accept or to reject the trained AI computer vision deep learning model and an associated training data set;

determining, by the one or more processors, the user accepted the trained AI computer vision deep learning model and the associated training data set; and marking, by the one or more processors, the trained AI computer vision deep learning model and the associated training data set as ready for use.

9. A computer program product comprising:

one or more computer readable storage media and program instructions stored on the one or more computer readable storage media, wherein the one or more computer readable storage media is not a transitory signal per se, the program instructions comprising:

program instructions to receive a plurality of images of an anchor object from a user, wherein the anchor object is a known fixed reference object comprised of a plurality of sub-objects;

program instructions to create an Artificial Intelligence (AI) computer vision deep learning model;

program instructions to train the AI computer vision deep learning model using a synthetic visual inspection data set to identify the anchor object in a three-dimensional representation; and program instructions to enable the user to interact with the trained AI computer vision deep learning model in an access mode, wherein the access mode is one of a training mode and a validation mode by superimposing one or mode target objects on the anchor object and capturing one or more images of the one or more target objects superimposed on the anchor object.

10. The computer program product of claim 9, further comprises:

subsequent to receiving the plurality of images of the anchor object from the user, generating, by the one or more processors, a baseline model of the anchor object, wherein generating the baseline model of the anchor object further comprises:

program instructions to find an anchor point of the anchor object;

program instructions to create an Augmented Reality (AR) Reference Object of the anchor object;

program instructions to convert the AR Reference Object of the anchor object into a three-dimensional (3D) model of the anchor object in USDZ format; and program instructions to download the AR Reference Object of the anchor object and the 3D model of the anchor object onto the user computing device.

11. The computer program product of claim 10, wherein converting the AR Reference Object of the anchor object into the 3D model of the anchor object in USDZ format further comprises:

program instructions to display the 3D model of the anchor object for the user on a user interface of the user computing device as the anchor object would appear in AR upon detecting the anchor object in a real-world scenario; and program instructions to enable the user to adjust a size of the 3D model of the anchor object.

12. The computer program product of claim 10 further comprises:

subsequent to generating the baseline model of the anchor object, generating, by the one or more processors, a training data set, wherein generating the training data set further comprises:

program instructions to search for an object in a scene using the camera on the user computing device;

program instructions to detect the object in the scene;

program instructions to superimpose the AR Reference Object of the anchor object detected in the scene to confirm that the object found in the scene is the anchor object;

program instructions to load one or more associated 3D models of target objects from a database;

program instructions to enable the user to select the one or more associated 3D models of the target objects on the user interface of the user computing device;

program instructions to enable the user to orient the one or more associated 3D models of the target objects selected relative to the anchor object using data augmentation through the user interface of the user computing device;

program instructions to calculate a xyz-ptz location of the one or more associated 3D models of the target objects selected relative to the anchor object;

program instructions to save an orientation of the one or more associated 3D models of the target objects in the database;

program instructions to determine the selection and the orientation of the one or more associated 3D models of the target objects is complete;

program instructions to enable the user to capture one or more additional baseline images of the scene using the camera on the user computing device;

program instructions to produce one or more training images of the one or more baseline images of the scene;

program instructions to produce one or more training images of the anchor object;

program instructions to produce one or more training images of the target objects selected; and program instructions to upload to a training dataset the one or more training images of the one or more baseline images produced of the scene and metadata associated with the one or more training images of the one or more baseline images produced of the scene; the one or more training images of the anchor object and metadata associated with the one or more training images of the anchor object; the one or more training images of the target objects and metadata associated with the one or more training images of the target objects; the xyz-ptz location of the one or more associated 3D models of the target objects relative to the anchor object; the orientation of the one or more associated 3D models of the target objects; and one or more user-inputted parameters.

13. The computer program product of claim 9, wherein training the AI computer vision deep learning model using a synthetic visual inspection data set to identify the anchor object in the three-dimensional representation further comprises:
program instructions to receive an input;
program instructions to overlay the one or more associated 3D models of the target objects on the scene;
program instructions to permute the one or more associated 3D models of the target objects randomly based on one or more function inputs received from the user;
program instructions to enable the user to resize the one or more associated 3D models of the target objects;
program instructions to enable the user to rotate the one or more associated 3D models of the target objects;
program instructions to enable the user to adjust one or more types of lighting illuminating the one or more associated 3D models of the target objects;
program instructions to capture one or more augmentation images of the one or more associated 3D models of the target objects superimposed on the scene; and
program instructions to compare the one or more augmentation images to previously captured augmentation images stored in the database.

14. The computer program product of claim 13, wherein enabling the user to interact with the trained AI computer vision deep learning model in the access mode further comprises:
program instructions to enable the user to select the training mode or the validation mode using the user interface on the user computing device;
program instructions to receive a response regarding the mode selected by the user;
program instructions to determine whether the user selected the validation mode from the response received;
program instructions to complete an inference on the one or more augmentation images;
program instructions to output one or more results of the inference on the one or more augmentation images to the user through the user interface of the user computing device;
program instructions to enable the user to review the one or more results of the inference on the one or more augmentation images;
program instructions to enable the user to accept or to reject the trained AI computer vision deep learning model and an associated training data set;
program instructions to determine the user accepted the trained AI computer vision deep learning model and the associated training data set; and program instructions to mark the trained AI computer vision deep learning model and the associated training data set as ready for use.

15. A computer system comprising:
one or more computer processors;
one or more computer readable storage media;
program instructions collectively stored on the one or more computer readable storage media for execution by at least one of the one or more computer processors, the stored program instructions comprising:
program instructions to receive a plurality of images of an anchor object from a user, wherein the anchor object is a known fixed reference object comprised of a plurality of sub-objects;
program instructions to create an Artificial Intelligence (AI) computer vision deep learning model;
program instructions to train the AI computer vision deep learning model using a synthetic visual inspection data set to identify the anchor object in a three-dimensional representation;
and
program instructions to enable the user to interact with the trained AI computer vision deep learning model in an access mode, wherein the access mode is one of a training mode and a validation mode by superimposing one or mode target objects on the anchor object and capturing one or more images of the one or more target objects superimposed on the anchor object.

16. The computer system of claim 15, further comprises:
subsequent to receiving the plurality of images of the anchor object from the user, generating, by the one or more processors, a baseline model of the anchor object, wherein generating the baseline model of the anchor object further comprises:
program instructions to find an anchor point of the anchor object;
program instructions to create an Augmented Reality (AR) Reference Object of the anchor object;
program instructions to convert the AR Reference Object of the anchor object into a three-dimensional (3D) model of the anchor object in USDZ format; and
program instructions to download the AR Reference Object of the anchor object and the 3D model of the anchor object onto the user computing device.

17. The computer system of claim 16, wherein converting the AR Reference Object of the anchor object into the 3D model of the anchor object in USDZ format further comprises:
program instructions to display the 3D model of the anchor object for the user on a user interface of the user computing device as the anchor object would appear in AR upon detecting the anchor object in a real-world scenario; and
program instructions to enable the user to adjust a size of the 3D model of the anchor object.

18. The computer system of 16 further comprises:
subsequent to generating the baseline model of the anchor object, generating, by the one or more processors, a training data set, wherein generating the training data set further comprises:
program instructions to search for an object in a scene using the camera on the user computing device;
program instructions to detect the object in the scene;

program instructions to superimpose the AR Reference Object of the anchor object detected in the scene to confirm that the object found in the scene is the anchor object;

program instructions to load one or more associated 3D models of target objects from a database;

program instructions to enable the user to select the one or more associated 3D models of the target objects on the user interface of the user computing device;

program instructions to enable the user to orient the one or more associated 3D models of the target objects selected relative to the anchor object using data augmentation through the user interface of the user computing device;

program instructions to calculate a xyz-ptz location of the one or more associated 3D models of the target objects selected relative to the anchor object;

program instructions to save an orientation of the one or more associated 3D models of the target objects in the database;

program instructions to determine the selection and the orientation of the one or more associated 3D models of the target objects is complete;

program instructions to enable the user to capture one or more additional baseline images of the scene using the camera on the user computing device;

program instructions to produce one or more training images of the one or more baseline images of the scene;

program instructions to produce one or more training images of the anchor object;

program instructions to produce one or more training images of the target objects selected; and program instructions to upload to a training dataset the one or more training images of the one or more baseline images produced of the scene and metadata associated with the one or more training images of the one or more baseline images produced of the scene; the one or more training images of the anchor object and metadata associated with the one or more training images of the anchor object; the one or more training images of the target objects and metadata associated with the one or more training images of the target objects; the xyz-ptz location of the one or more associated 3D models of the target objects relative to the anchor object; the orientation of the one or more associated 3D models of the target objects; and one or more user-inputted parameters.

19. The computer system of claim 15, wherein training the AI computer vision deep learning model using a synthetic visual inspection data set to identify the anchor object in the three-dimensional representation further comprises:

program instructions to receive an input;

program instructions to overlay the one or more associated 3D models of the target objects on the scene;

program instructions to permute the one or more associated 3D models of the target objects randomly based on one or more function inputs received from the user;

program instructions to enable the user to resize the one or more associated 3D models of the target objects;

program instructions to enable the user to rotate the one or more associated 3D models of the target objects;

program instructions to enable the user to adjust one or more types of lighting illuminating the one or more associated 3D models of the target objects;

program instructions to capture one or more augmentation images of the one or more associated 3D models of the target objects superimposed on the scene; and program instructions to compare the one or more augmentation images to previously captured augmentation images stored in the database.

20. The computer system of claim 19, wherein enabling the user to interact with the trained AI computer vision deep learning model in the access mode further comprises:

program instructions to enable the user to select the training mode or the validation mode using the user interface on the user computing device;

program instructions to receive a response regarding the mode selected by the user;

program instructions to determine whether the user selected the validation mode from the response received;

program instructions to complete an inference on the one or more augmentation images;

program instructions to output one or more results of the inference on the one or more augmentation images to the user through the user interface of the user computing device;

program instructions to enable the user to review the one or more results of the inference on the one or more augmentation images;

program instructions to enable the user to accept or to reject the trained AI computer vision deep learning model and an associated training data set;

program instructions to determine the user accepted the trained AI computer vision deep learning model and the associated training data set; and program instructions to mark the trained AI computer vision deep learning model and the associated training data set as ready for use.

\* \* \* \* \*